(12) United States Patent
Zhao et al.

(10) Patent No.: US 11,540,329 B2
(45) Date of Patent: Dec. 27, 2022

(54) INFORMATION TRANSMISSION METHOD, TERMINAL DEVICE, AND NETWORK DEVICE

(71) Applicant: HUAWEI TECHNOLOGIES CO., LTD., Guangdong (CN)

(72) Inventors: Yue Zhao, Beijing (CN); Zheng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 17/093,341

(22) Filed: Nov. 9, 2020

(65) Prior Publication Data
US 2021/0058975 A1    Feb. 25, 2021

Related U.S. Application Data

(63) Continuation of application No. PCT/CN2018/086621, filed on May 11, 2018.

(51) Int. Cl.
*H04W 74/08* (2009.01)
*H04W 72/04* (2009.01)
(Continued)

(52) U.S. Cl.
CPC ....... *H04W 74/0833* (2013.01); *H04W 72/04* (2013.01); *H04W 72/1268* (2013.01); *H04W 72/14* (2013.01)

(58) Field of Classification Search
None
See application file for complete search history.

(56) References Cited

U.S. PATENT DOCUMENTS

| 9,807,800 B2 | 10/2017 | Sun et al. |
| 2016/0100422 A1 | 4/2016 | Papasakellariou et al. |

(Continued)

FOREIGN PATENT DOCUMENTS

| CN | 105101454 A | 11/2015 |
| CN | 105379336 A | 3/2016 |

(Continued)

OTHER PUBLICATIONS

3GPP TS 36.321 V15.1.0 (2018-03), "3rd Generation Partnership Project; Technical Specification Group Radio Access Network; Evolved Universal Terrestrial Radio Access (E-UTRA); Medium Access Control (MAC) protocol specification (Release 15)," total 109 pages.

(Continued)

*Primary Examiner* — Kenny S Lin
(74) *Attorney, Agent, or Firm* — Fish & Richardson P.C.

(57) ABSTRACT

An information transmission method, a communications device, and a network device are provided. The information transmission method includes: when a communications device is at a coverage enhancement level 0 or a coverage enhancement level 1, or in coverage enhancement mode A, receiving a random access response, wherein the random access response comprises indication information and uplink grant information, the indication information is used to indicate a message 3 is a first message 3 or a second message 3, wherein the uplink grant information comprises first resource information and repetition quantity information; and sending the message 3 based on the indication information, the first resource information, and the repetition quantity information. The method and the device that are provided in embodiments of this application may be applied to a communications system, such as V2X, LTE-V, V2V, an (Continued)

internet of vehicles, MTC, LTE-M, M2M, or an internet of things.

12 Claims, 9 Drawing Sheets

(51) Int. Cl.
*H04W 72/12* (2009.01)
*H04W 72/14* (2009.01)

(56) References Cited

U.S. PATENT DOCUMENTS

| | | | |
|---|---|---|---|
| 2020/0068608 A1* | 2/2020 | Ye | H04W 72/048 |
| 2021/0045139 A1* | 2/2021 | Takeda | H04W 72/14 |
| 2021/0058823 A1* | 2/2021 | Liu | H04W 28/06 |

FOREIGN PATENT DOCUMENTS

| | | |
|---|---|---|
| WO | 2015005701 A1 | 1/2015 |
| WO | 2017197063 A1 | 11/2017 |

OTHER PUBLICATIONS

3GPP TS 36.213 V14.3.0 (2017-06), "3rd Generation Partnership Project;Technical Specification Group Radio Access Network;Evolved Universal Terrestrial Radio Access (E-UTRA);Physical layer procedures(Release 14)," Jun. 2017, 460 pages.

3GPP TS 36.213 V15.1.0 (2018-03), 3rd Generation Partnership Project;Technical Specification Group Radio Access Network;Evolved Universal Terrestrial Radio Access (E-UTRA); Physical layer procedures(Release 15), Mar. 2018, 499 pages.

Ericsson, "Clarification of PRACH for eMTC," 3GPP TSG RAN WG1 Meeting #84, R1-160256, St Julian's, Malta, Feb. 15-19, 2016, 5 pages.

Ericsson, "Early data transmission for MTC," 3GPP TSG-RAN WG1 Meeting #92bis, R1-1804121, Sanya, China, Apr. 16-20, 2018, 5 pages.

PCT International Search Report and Written Opinion issued in International Application No. PCT/CN2018/086621 dated Jan. 30, 2019, 15 pages (with English translation).

NTT DOCOMO, Inc., "Views on early data transmission in efeMTC," 3GPP TSG RAN WG1 Meeting 92, R1-1802453, Athens, Greece, Feb. 26-Mar. 2, 2018, 6 pages.

Office Action issued in Korean Application No. 2020-7034990 dated Dec. 9, 2021, 25 pages (with English translation).

Office Action issued in Canadian Application No. 3,103,307 dated Dec. 1, 2021, 6 pages.

Extended European Search Report issued in European Application No. 18917923.7 dated Feb. 11, 2021, 8 pages.

Zte et al., "On early data transmission for eMTC," 3GPP TSG HAN WG1 Meeting #92, R1-1801619, Athens, Greece, Feb. 26-Mar. 2, 2018, 6 pages.

Office Action issued in Indian Application No. 202027048404 dated Dec. 7, 2021, 5 pages.

Huawei, HiSilicon, "On early data transmission for eFeMTC," 3GPP TSG RAN WG1 Meeting #89, R1-1708198, Hangzhou, China, May 15-19, 2017, 3 pages.

Intel Corporation, "Design of sub-PRB PUSCH for efeMTC," 3GPP TSG RAN WG1 Meeting #92bis, R1-1804696, Sanya, China, Apr. 16-20, 2018, 8 pages.

Nokia, Nokia Shanghai Bell, "Data transmission during random access procedure," 3GPP TSG RAN WG1 Meeting #92, R1-1802254, Athens, Greece, Feb. 26-Mar. 2, 2018, 3 pages.

Office Action issued in Chinese Application No. 201880093280.1 dated Mar. 30, 2022, 9 pages.

Samsung, "Early data transmission for eMTC," 3GPP TSG RAN WG1 Meeting #91, R1-1720260, Reno, USA, Nov. 27-Dec. 1, 2017, 5 pages.

Huawei, HiSilicon, "Early data transmission for eFeMTC," 3GPP TSG RAN WG1 Meeting #92bis, R1-1803884, Sanya, China, Apr. 16-20, 2018, 7 pages.

Office Action issued in Korean Application No. 2020-7034990 dated Jun. 15, 2022, 4 pages (with English translation).

Samsung, "Early data transmission for eMTC," 3GPP TSG RAN WG1 Meeting #92, R1-1801924, Athens, Greece, Feb. 26-Mar. 2, 2018, 6 pages.

* cited by examiner

INFORMATION TRANSMISSION METHOD, TERMINAL DEVICE, AND NETWORK DEVICE

CROSS-REFERENCE TO RELATED APPLICATIONS

This application is a continuation of International Application No. PCT/CN2018/086621, filed on May 11, 2018, the disclosure of which is hereby incorporated by reference in its entirety.

TECHNICAL FIELD

Embodiments of this application relate to the communications field, and in particular, to an information transmission method, a terminal device, and a network device.

BACKGROUND

Currently, large-scale application and deployment of wireless communications systems can provide various types of communication, for example, a voice, data, and multimedia services, for a plurality of users.

In a process of discussion on a current long term evolution (LTE) technology, for a third message, namely, a Msg3, in a random access process, uplink user data may be transmitted through the Msg3, and a medium access control protocol (MAC) random access response (RAR) is used in the transmission.

Coverage enhancement modes of a terminal device may include a coverage enhancement mode A (CE mode A) and a coverage enhancement mode B (CE mode B). The coverage enhancement mode A is used for a smaller coverage enhancement degree, and the coverage enhancement mode B is used for a larger coverage enhancement degree.

In the prior art, when a terminal device is in mode A and mode B, transmission performance of a network device is poor.

SUMMARY

Embodiments of this application provide an information transmission method, a terminal device, and a network device, to improve transmission performance of the network device.

According to a first aspect, an embodiment of this application provides an information transmission method, including:

when a communications device is at a coverage enhancement level 0 or a coverage enhancement level 1, or in coverage enhancement mode A, receiving, by the communications device, a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the communications device to send the message 3 on a first narrowband in an uplink bandwidth, and the repetition quantity information is used to indicate a quantity of times that the communications device is to repeatedly send the message 3; and if the uplink bandwidth of the communications device is 1.4 megahertz MHz, when the indication information indicates that the message 3 to be sent by the communications device is the first message 3, a quantity of bits of the uplink grant information is 20; or when the indication information indicates that the message 3 to be sent by the communications device is the second message 3, a quantity of bits of the uplink grant information is 12; and sending, by the communications device, the message 3 based on the indication information, the first resource information, and the repetition quantity information.

In this embodiment of this application, a random access response sent by a network device includes indication information and uplink grant information, the indication information may indicate that a message 3 to be sent by a terminal device is a first message 3 or a second message 3, and the uplink grant information includes first resource information and repetition quantity information; and if an uplink bandwidth of the terminal device is 1.4 megahertz MHz, when the indication information indicates that the message 3 to be sent by the terminal device is the first message 3, a quantity of bits of the uplink grant information is 20; or when the indication information indicates that the message 3 to be sent by the terminal device is the second message 3, a quantity of bits of the uplink grant information is 12. Therefore, the uplink grant information used when the terminal device sends the second message 3 is eight bits less than the uplink grant information used when the terminal device sends the first message 3, thereby improving transmission performance of a MAC RAR.

According to a second aspect, an embodiment of this application provides an information transmission method, including:

when a communications device is at a coverage enhancement level 0 or a coverage enhancement level 1, or in coverage enhancement mode A, sending, by a network device, a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the communications device to send the message 3 on a first narrowband in an uplink bandwidth, and the repetition quantity information is used to indicate a quantity of times that the communications device is to repeatedly send the message 3; and if the uplink bandwidth of the communications device is 1.4 megahertz MHz, when the indication information indicates that the message 3 to be sent by the communications device is the first message 3, a quantity of bits of the uplink grant information is 20; or when the indication information indicates that the message 3 to be sent by the communications device is the second message 3, a quantity of bits of the uplink grant information is 12; and receiving, by the network device, the message 3.

In this embodiment of this application, a random access response sent by the network device includes indication information and uplink grant information, the indication information may indicate that a message 3 to be sent by a terminal device is a first message 3 or a second message 3, and the uplink grant information includes first resource information and repetition quantity information; and if an uplink bandwidth of the terminal device is 1.4 megahertz MHz, when the indication information indicates that the message 3 to be sent by the terminal device is the first message 3, a quantity of bits of the uplink grant information is 20; or when the indication information indicates that the message 3 to be sent by the terminal device is the second message 3, a quantity of bits of the uplink grant information is 12. Therefore, the uplink grant information used when the terminal device sends the second message 3 is eight bits less than the uplink grant information used when the terminal device sends the first message 3, thereby improving transmission performance of a MAC RAR.

In a possible design, no bit in the uplink grant information indicates an index of a narrowband, and the narrowband is used by the communications device to receive a physical downlink control channel; a quantity of bits of a modulation and coding scheme field in the uplink grant information is 1; and there is no padding bit in the uplink grant information; or no bit in the uplink grant information indicates a modulation and coding scheme field, and there is no padding bit in the uplink grant information; or no bit in the uplink grant information indicates an index of a narrowband, and the narrowband is used by the communications device to receive a physical downlink control channel; no bit in the uplink grant information indicates a modulation and coding scheme; and a quantity of padding bits in the uplink grant information is 1; and the physical downlink control channel is used for scheduling of the message 3 or a message 4.

For example, no bit in the uplink grant information indicates the index of the narrowband. For example, the uplink grant information does not include a field indicating the index of the narrowband. For example, in mode A and in the bandwidth of 1.4 MHz, the uplink grant information does not include a Msg3 PUSCH narrowband index field, so that $N_{NB}^{index}$ bits may be saved; the uplink grant information does not include a Msg3/4 MPDCCH narrowband index field, so that two bits are saved; the modulation and coding scheme field in the uplink grant information is reduced from three bits to one bit, so that two bits are saved; in addition, there is no padding bit in the uplink grant information. Therefore, eight bits are saved. Therefore, the eight bits are released from the uplink grant information, and the released bits are used to indicate a more flexible narrowband index.

For another example, a Msg3 PUSCH narrowband index field has only one bit; no bit in the uplink grant information indicates the modulation and coding scheme field, so that three bits are saved; there is no padding bit in the uplink grant information, so that $4-N_{NB}^{index}$ are saved. Therefore, eight bits are released from the uplink grant information, and the released bits are used to indicate a more flexible narrowband index.

For another example, no bit in the uplink grant information indicates the index of the narrowband. For example, the uplink grant information does not include a Msg3 PUSCH narrowband index field, so that $N_{NB}^{index}$ bits may be saved; the uplink grant information does not include a Msg3/4 MPDCCH narrowband index field, so that two bits are saved; no bit in the uplink grant information indicates the modulation and coding scheme, so that three bits are saved; in mode A, the quantity of padding bits in the uplink grant information is reduced from $4-N_{NB}^{index}$ to one bit, so that $3-N_{NB}^{index}$ bits are saved. Therefore, eight bits are released from the uplink grant information, and the released bits are used to indicate a more flexible narrowband index.

According to a third aspect, an embodiment of this application provides an information transmission method, including:

when a communications device is at a coverage enhancement level 2 or a coverage enhancement level 3, or in coverage enhancement mode B, receiving, by the communications device, a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the communications device to send the message 3 on a first narrowband in an uplink bandwidth, the repetition quantity information is used to indicate a quantity of times that the communications device is to repeatedly send the message 3, and the second resource information is used to indicate an index of the first narrowband of the communications device in the uplink bandwidth; and when the indication information indicates that the message 3 to be sent by the communications device is the first message 3, a quantity of bits of the second resource information is 2; or when the indication information indicates that the message 3 to be sent by the communications device is the second message 3, a quantity of bits of the second resource information is N, where N is a pre-specified integer, and N is equal to $N_{NB}^{index}$, or N is equal to 3, or N is equal to 4, where $N_{NB}^{index}$ is a quantity of bits required to indicate all narrowbands in the uplink bandwidth; and sending, by the communications device, the message 3 based on the indication information, the first resource information, the second resource information, and the repetition quantity information.

In this embodiment of this application, a random access response sent by a network device includes indication information and uplink grant information, the indication information may indicate that a message 3 to be sent by a terminal device is a first message 3 or a second message 3, and the uplink grant information includes first resource information, second resource information, and repetition quantity information. The second resource information used when the terminal device sends the second message 3 is different from the second resource information used when the terminal device sends the first message 3. When the message 3 to be sent by the terminal device is the first message 3, a quantity of bits of the second resource information is 2; or when the message 3 to be sent by the terminal device is the second message 3, a quantity of bits of the second resource information is N. For example, N is equal to $N_{NB}^{index}$, where $N_{NB}^{index}$ is a narrowband-related parameter, $N_{NB}^{index}=\lceil \log_2(N_{NB}) \rceil$, $N_{NB}^{index}$ represents a quantity of bits used to indicate an index of a narrowband, $N_{NB}^{index}=\lfloor N_{RB}^{UL}/6 \rfloor$, $N_{NB}$ represents a quantity of narrowbands in a system bandwidth, and $N_{RB}^{UL}$ represents a quantity of RBs in an uplink system bandwidth. When the system bandwidth is equal to 10 MHz, $N_{NB}^{index}=3$. In this case, three bits can indicate an index of any narrowband in the 10-MHz system bandwidth, so that the second resource information can indicate more narrowband indexes. Therefore, scheduling flexibility of the network device can be improved.

According to a fourth aspect, an embodiment of this application provides an information transmission method, including:

when a communications device is at a coverage enhancement level 2 or a coverage enhancement level 3, or in coverage enhancement mode B, sending, by a network device, a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the communications device to send the message 3 on a first narrowband in an uplink bandwidth, the repetition quantity information is used to indicate a quantity of times that the communications device is to repeatedly send the message 3, and the second resource information is used to indicate an index of the first narrowband of the communications device in the uplink bandwidth; and when the indication information indicates that the message 3 to be sent by the communications device is the first message 3, a quantity of bits of the second resource information is 2; or when the indication information indicates that the message 3 to be sent by the communications device is the second message 3, a quantity of bits of the second resource information is N, where N is a pre-specified integer, and N is equal to $N_{NB}^{index}$, or N is equal to 3, or N is equal to 4, where $N_{NB}^{index}$ is a quantity of bits required to indicate all narrowbands in the uplink bandwidth; and receiving, by the network device, the message 3.

In this embodiment of this application, a random access response sent by the network device includes indication information and uplink grant information, the indication information may indicate that a message 3 to be sent by a terminal device is a first message 3 or a second message 3, and the uplink grant information includes first resource information, second resource information, and repetition quantity information. The second resource information used when the terminal device sends the second message 3 is different from the second resource information used when the terminal device sends the first message 3. When the message 3 to be sent by the terminal device is the first message 3, a quantity of bits of the second resource information is 2; or when the message 3 to be sent by the terminal device is the second message 3, a quantity of bits of the second resource information is N. For example, N is equal to $N_{NB}^{index}$, where $N_{NB}^{index}$ is a narrowband-related parameter, $N_{NB}^{index} = \lceil \log_2(N_{NB}) \rceil$, represents a quantity of bits used to indicate an index of a narrowband, $N_{NB}^{index} \lfloor N_{RB}^{UL}/6 \rfloor$, $N_{NB}$ represents a quantity of narrowbands in a system bandwidth, and $N_{RB}^{UL}$ represents a quantity of RBs in an uplink system bandwidth. When the system bandwidth is equal to 10 MHz, $N_{NB}^{index}=3$. In this case, three bits can indicate an index of any narrowband in the 10-MHz system bandwidth, so that the second resource information can indicate more narrowband indexes. Therefore, scheduling flexibility of the network device can be improved.

According to a fifth aspect, an embodiment of this application provides an information transmission method, including:

when a communications device is at a coverage enhancement level 0 or a coverage enhancement level 1, or in coverage enhancement mode A, receiving, by the communications device, a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the communications device to send the message 3 on a first narrowband in an uplink bandwidth, and the repetition quantity information is used to indicate a quantity of times that the communications device is to repeatedly send the message 3; and when the indication information indicates that the message 3 to be sent by the communications device is the first message 3, a quantity of bits of the first resource information is 4; or when the indication information indicates that the message 3 to be sent by the communications device is the second message 3, a quantity of bits of the first resource information is L, where L is a pre-specified positive integer, and L is greater than 4; and sending, by the communications device, the message 3 based on the indication information, the first resource information, and the repetition quantity information.

In this embodiment of this application, a random access response sent by a network device includes indication information and uplink grant information, the indication information may indicate that a message 3 to be sent by a terminal device is a first message 3 or a second message 3, and the uplink grant information includes first resource information and repetition quantity information. The first resource information used when the terminal device sends the second message 3 is different from the first resource information used when the terminal device sends the first message 3. When the message 3 to be sent by the terminal device is the first message 3, a quantity of bits of the first resource information is 4; or when the message 3 to be sent by the terminal device is the second message 3, a quantity of bits of the first resource information is L, where L is greater than 4. When the message 3 to be sent by the terminal device is the second message 3, the first resource information may indicate more types of resources for sending the message 3 on a first narrowband, thereby improving scheduling flexibility of the network device.

According to a sixth aspect, an embodiment of this application provides an information transmission method, including:

when a communications device is at a coverage enhancement level 0 or a coverage enhancement level 1, or in coverage enhancement mode A, sending, by a network device, a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the communications device to send the message 3 on a first narrowband in an uplink bandwidth, and the repetition quantity information is used to indicate a quantity of times that the communications device is to repeatedly send the message 3; and when the indication information indicates that the message 3 to be sent by the communications device is the first message 3, a quantity of bits of the first resource information is 4; or when the indication information indicates that the message 3 to be sent by the communications device is the second message 3, a quantity of bits of the first resource information is L, where L is a pre-specified positive integer, and L is greater than 4; and receiving, by the network device, the message 3.

In this embodiment of this application, a random access response sent by the network device includes indication information and uplink grant information, the indication information may indicate that a message 3 to be sent by a terminal device is a first message 3 or a second message 3, and the uplink grant information includes first resource information and repetition quantity information. The first resource information used when the terminal device sends the second message 3 is different from the first resource information used when the terminal device sends the first message 3. When the message 3 to be sent by the terminal device is the first message 3, a quantity of bits of the first resource information is 4; or when the message 3 to be sent by the terminal device is the second message 3, a quantity of bits of the first resource information is L, where L is greater than 4. When the message 3 to be sent by the terminal device is the second message 3, the first resource information may indicate more types of resources for sending the message 3 on a first narrowband, thereby improving scheduling flexibility of the network device.

According to a seventh aspect, an embodiment of this application provides an information transmission method, including:

receiving, by a communications device, a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the communications device to send the message 3 on a first narrowband in an uplink bandwidth, the repetition quantity information is used to indicate a quantity of times that the communications device is to repeatedly send the message 3, and the second resource information is used to indicate an index of a narrowband, where the narrowband is used by the communications device to receive a physical downlink control channel, and the physical downlink control channel is used for scheduling of the message 3 or a message 4; and when the indication information indicates that the message 3 to be sent by the communications device is the first message 3, a quantity of bits of the second resource information is 2; or when the indication information indicates that the message 3 to be sent by the communications device is the second message 3, a quantity of bits of the second resource information is M, where M is a pre-specified integer, and M is equal to $N_{NB}^{index}$, or M is equal to 3, or M is equal to 4, where $N_{NB}^{index}$ is a quantity of bits required to indicate all narrowbands in the uplink bandwidth; and sending, by the communications device, the message 3 based on the indication information, the first resource information, the second resource information, and the repetition quantity information.

In this embodiment of this application, a random access response sent by a network device includes indication information and uplink grant information, the indication information may indicate that a message 3 to be sent by a terminal device is a first message 3 or a second message 3, and the uplink grant information includes first resource information, second resource information, and repetition quantity information. The second resource information used when the terminal device sends the second message 3 is different from the second resource information used when the terminal device sends the first message 3. When the message 3 to be sent by the terminal device is the first message 3, a quantity of bits of the second resource information is 2; or when the indication information indicates that the message 3 to be sent by the terminal device is the second message 3, a quantity of bits of the second resource information is M, where M is a pre-specified integer, M is equal to $N_{NB}^{index}$, or M is equal to 3, or M is equal to 4, where $N_{NB}^{index}$ is a quantity of bits required to indicate all narrowbands in an uplink bandwidth. When the message 3 to be sent by the terminal device is the second message 3, the second resource information may indicate more types of indexes of a first narrowband, thereby improving scheduling flexibility of the network device.

According to an eighth aspect, an embodiment of this application provides an information transmission method, including:

sending, by a network device, a random access response, where the random access response includes indication information and uplink grant information, the indication information is used to indicate that a message 3 to be sent by a communications device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the communications device to send the message 3 on a first narrowband in an uplink bandwidth, the repetition quantity information is used to indicate a quantity of times that the communications device is to repeatedly send the message 3, and the second resource information is used to indicate an index of a narrowband, where the narrowband is used by the communications device to receive a physical downlink control channel, and the physical downlink control channel is used for scheduling of the message 3 or a message 4; and when the indication information indicates that the message 3 to be sent by the communications device is the first message 3, a quantity of bits of the second resource information is 2; or when the indication information indicates that the message 3 to be sent by the communications device is the second message 3, a quantity of bits of the second resource information is M, where M is a pre-specified integer, and M is equal to $N_{NB}^{index}$, or M is equal to 3, or M is equal to 4, where $N_{NB}^{index}$ is a quantity of bits required to indicate all narrowbands in the uplink bandwidth; and receiving, by the network device, the message 3.

In this embodiment of this application, a random access response sent by the network device includes indication information and uplink grant information, the indication information may indicate that a message 3 to be sent by a terminal device is a first message 3 or a second message 3, and the uplink grant information includes first resource information, second resource information, and repetition quantity information. The second resource information used when the terminal device sends the second message 3 is different from the second resource information used when the terminal device sends the first message 3. When the message 3 to be sent by the terminal device is the first message 3, a quantity of bits of the second resource information is 2; or when the indication information indicates that the message 3 to be sent by the terminal device is the second message 3, a quantity of bits of the second resource information is M, where M is a pre-specified integer, M is equal to $N_{NB}^{index}$, or M is equal to 3, or M is equal to 4, where $N_{NB}^{index}$ is a quantity of bits required to indicate all narrowbands in an uplink bandwidth. When the message 3 to be sent by the terminal device is the second message 3, the second resource information may indicate more types of indexes of a first narrowband, thereby improving scheduling flexibility of the network device.

According to a ninth aspect, an embodiment of this application provides an information transmission method, including:

when a communications device is at a coverage enhancement level 2 or a coverage enhancement level 3, or in coverage enhancement mode B, receiving, by the communications device, a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the communications device to send the message 3 on a first narrowband in an uplink bandwidth, and the repetition quantity information is used to indicate a quantity of times that the communications device is to repeatedly send the message 3; and when the indication information indicates that the message 3 to be sent by the communications device is the first message 3, a quantity of bits of the first resource information is 3; or when the indication information indicates that the message 3 to be sent by the communications device is the second message 3, a quantity of bits of the first resource information is K, where K is a pre-specified positive integer, and K is greater than 3; and sending, by the communications device, the message 3 based on the indication information, the first resource information, and the repetition quantity information.

In this embodiment of this application, a random access response sent by a network device includes indication information and uplink grant information, the indication information may indicate that a message 3 to be sent by a terminal device is a first message 3 or a second message 3, and the uplink grant information includes first resource information and repetition quantity information. The first resource information used when the terminal device sends the second message 3 is different from the first resource information used when the terminal device sends the first message 3. When the indication information indicates that the message 3 to be sent by the terminal device is the first message 3, a quantity of bits of the first resource information is 3; or when the indication information indicates that the message 3 to be sent by the terminal device is the second message 3, a quantity of bits of the first resource information is K, where K is greater than 3. When the message 3 to be sent by the terminal device is the second message 3, the first resource information may indicate more types of resources for sending on a first narrowband, thereby improving scheduling flexibility of the network device.

According to a tenth aspect, an embodiment of this application provides an information transmission method, including:

when a communications device is at a coverage enhancement level 2 or a coverage enhancement level 3, or in coverage enhancement mode B, sending, by a network device, a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the communications device to send the message 3 on a first narrowband in an uplink bandwidth, and the repetition quantity information is used to indicate a quantity of times that the communications device is to repeatedly send the message 3; and when the indication information indicates that the message 3 to be sent by the communications device is the first message 3, a quantity of bits of the first resource information is 3; or when the indication information indicates that the message 3 to be sent by the communications device is the second message 3, a quantity of bits of the first resource information is K, where K is a pre-specified positive integer, and K is greater than 3; and receiving, by the network device, the message 3.

In this embodiment of this application, a random access response sent by the network device includes indication information and uplink grant information, the indication information may indicate that a message 3 to be sent by a terminal device is a first message 3 or a second message 3, and the uplink grant information includes first resource information and repetition quantity information. The first resource information used when the terminal device sends the second message 3 is different from the first resource information used when the terminal device sends the first message 3. When the indication information indicates that the message 3 to be sent by the terminal device is the first message 3, a quantity of bits of the first resource information is 3; or when the indication information indicates that the message 3 to be sent by the terminal device is the second message 3, a quantity of bits of the first resource information is K, where K is greater than 3. When the message 3 to be sent by the terminal device is the second message 3, the first resource information may indicate more types of resources for sending on a first narrowband, thereby improving scheduling flexibility of the network device.

According to an eleventh aspect, an embodiment of this application provides a communications device, including a receiving module, a processing module, and a sending module, where the processing module is configured to: when the communications device is at a coverage enhancement level 0 or a coverage enhancement level 1, or in coverage enhancement mode A, receive a random access response by using the receiving module, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, and when an uplink bandwidth of the communications device is 1.4 megahertz MHz, the first resource information is used to indicate a resource used by the communications device to send the message 3 on a first narrowband in the uplink bandwidth, and the repetition quantity information is used to indicate a quantity of times that the communications device is to repeatedly send the message 3; and when the indication information indicates that the message 3 to be sent by the communications device is the first message 3, a quantity of bits of the uplink grant information is 20; or when the indication information indicates that the message 3 to be sent by the communications device is the second message 3, a quantity of bits of the uplink grant information is 12; and the processing module is further configured to send the message 3 based on the indication information, the first resource information, and the repetition quantity information by using the sending module.

According to a twelfth aspect, an embodiment of this application provides a network device, including a sending module, a processing module, and a receiving module, where the processing module is configured to: when a communications device is at a coverage enhancement level 0 or a coverage enhancement level 1, or in coverage enhancement mode A, generate a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, and when an uplink bandwidth of the communications device is 1.4 megahertz MHz, the first resource information is used to indicate a resource used by the communications device to send the message 3 on a first narrowband in the uplink bandwidth, and the repetition quantity information is used to indicate a quantity of times that the communications device is to repeatedly send the message 3; and when the indication information indicates that the message 3 to be sent by the communications device is the first message 3, a quantity of bits of the uplink grant information is 20; or when the indication information indicates that the message 3 to be sent by the communications device is the second message 3, a quantity of bits of the uplink grant information is 12;

the processing module is further configured to send the random access response by using the sending module; and the processing module is further configured to receive the message 3 by using the receiving module.

In a possible design, no bit in the uplink grant information indicates an index of a narrowband, and the narrowband is used by the communications device to receive a physical downlink control channel; a quantity of bits of a modulation and coding scheme field in the uplink grant information is 1; and there is no padding bit in the uplink grant information; or no bit in the uplink grant information indicates a modulation and coding scheme field, and there is no padding bit in the uplink grant information; or no bit in the uplink grant information indicates an index of a narrowband, and the narrowband is used by the communications device to receive a physical downlink control channel; no bit in the uplink grant information indicates a modulation and coding scheme field; and a quantity of padding bits in the uplink grant information is 1; and the physical downlink control channel is used for scheduling of the message 3 or a message 4.

According to a thirteenth aspect, an embodiment of this application provides a communications device, including a receiving module, a processing module, and a sending module, where the processing module is configured to: when the communications device is at a coverage enhancement level 2 or a coverage enhancement level 3, or in coverage enhancement mode B, receive a random access response by using the receiving module, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the communications device to send the message 3 on a first narrowband in an uplink bandwidth, the repetition quantity information is used to indicate a quantity of times that the communications device is to repeatedly send the message 3, and the second resource information is used to indicate an index of the first narrowband of the communications device in the uplink bandwidth; and when the indication information indicates that the message 3 to be sent by the communications device is the first message 3, a quantity of bits of the second resource information is 2; or when the indication information indicates that the message 3 to be sent by the communications device is the second message 3, a quantity of bits of the second resource information is N, where N is a pre-specified integer, and N is equal to $N_{NB}^{index}$, or N is equal to 3, or N is equal to 4, where $N_{NB}^{index}$ is a quantity of bits required to indicate all narrowbands in the uplink bandwidth; and the processing module is further configured to send the message 3 based on the indication information, the first resource information, the second resource information, and the repetition quantity information by using the sending module.

According to a fourteenth aspect, an embodiment of this application provides a network device, including a sending module, a processing module, and a receiving module, where the processing module is configured to: when a communications device is at a coverage enhancement level 2 or a coverage enhancement level 3, or in coverage enhancement mode B, generate a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the communications device to send the message 3 on a first narrowband in an uplink bandwidth, the repetition quantity information is used to indicate a quantity of times that the communications device is to repeatedly send the message 3, and the second resource information is used to indicate an index of the first narrowband of the communications device in the uplink bandwidth; and when the indication information indicates that the message 3 to be sent by the communications device is the first message 3, a quantity of bits of the second resource information is 2; or when the indication information indicates that the message 3 to be sent by the communications device is the second message 3, a quantity of bits of the second resource information is N, where N is a pre-specified integer, and N is equal to $N_{NB}^{index}$, or N is equal to 3, or N is equal to 4, where $N_{NB}^{index}$ is a quantity of bits required to indicate all narrowbands in the uplink bandwidth;

the processing module is further configured to send the random access response by using the sending module; and the processing module is further configured to receive the message 3 by using the receiving module.

According to a fifteenth aspect, an embodiment of this application provides a communications device, including a receiving module, a processing module, and a sending module, where the processing module is configured to: when the communications device is at a coverage enhancement level 0 or a coverage enhancement level 1, or in coverage enhancement mode A, receive a random access response by using the receiving module, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the communications device to send the message 3 on a first narrowband in an uplink bandwidth, and the repetition quantity information is used to indicate a quantity of times that the communications device is to repeatedly send the message 3; and when the indication information indicates that the message 3 to be sent by the communications device is the first message 3, a quantity of bits of the first resource information is 4; or when the indication information indicates that the message 3 to be sent by the communications device is the second message 3, a quantity of bits of the first resource information is L, where L is a pre-specified positive integer, and L is greater than 4; and the processing module is configured to send the message 3 based on the indication information, the first resource information, and the repetition quantity information by using the sending module.

According to a sixteenth aspect, an embodiment of this application provides a network device, including a sending module, a processing module, and a receiving module, where the processing module is configured to: when a communications device is at a coverage enhancement level 0 or a coverage enhancement level 1, or in coverage enhancement mode A, generate a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the communications device to send the message 3 on a first narrowband in an uplink bandwidth, and the repetition quantity information is used to indicate a quantity of times that the communications device is to repeatedly send the message 3; and when the indication information indicates that the message 3 to be sent by the communications device is the first message 3, a quantity of bits of the first resource information is 4; or when the indication information indicates that the message 3 to be sent by the communications device is the second message 3, a quantity of bits of the first resource information is L, where L is a pre-specified positive integer, and L is greater than 4;

the processing module is further configured to send the random access response by using the sending module; and the processing module is further configured to receive the message 3 by using the receiving module.

According to a seventeenth aspect, an embodiment of this application provides a communications device, including a receiving module, a processing module, and a sending module, where the processing module is configured to receive a random access response by using the receiving module, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the communications device to send the message 3 on a first narrowband in an uplink bandwidth, the repetition quantity information is used to indicate a quantity of times that the communications device is to repeatedly send the message 3, and the second resource information is used to indicate an index of a narrowband, where the narrowband is used by the communications device to receive a physical downlink control channel, and the physical downlink control channel is used for scheduling of the message 3 or a message 4; and when the indication information indicates that the message 3 to be sent by the communications device is the first message 3, a quantity of bits of the second resource information is 2; or when the indication information indicates that the message 3 to be sent by the communications device is the second message 3, a quantity of bits of the second resource information is M, where M is a pre-specified integer, and M is equal to $N_{NB}^{index}$, or M is equal to 3, or M is equal to 4, where $N_{NB}^{index}$ is a quantity of bits required to indicate all narrowbands in the uplink bandwidth; and the processing module is configured to send the message 3 based on the indication information, the first resource information, the second resource information, and the repetition quantity information by using the sending module.

According to an eighteenth aspect, an embodiment of this application provides a network device, including a sending module, a processing module, and a receiving module, where the processing module is configured to generate a random access response, where the random access response includes indication information and uplink grant information, the indication information is used to indicate that a message 3 to be sent by a communications device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the communications device to send the message 3 on a first narrowband in an uplink bandwidth, the repetition quantity information is used to indicate a quantity of times that the communications device is to repeatedly send the message 3, and the second resource information is used to indicate an index of a narrowband, where the narrowband is used by the communications device to receive a physical downlink control channel, and the physical downlink control channel is used for scheduling of the message 3 or a message 4; and when the indication information indicates that the message 3 to be sent by the communications device is the first message 3, a quantity of bits of the second resource information is 2; or when the indication information indicates that the message 3 to be sent by the communications device is the second message 3, a quantity of bits of the second resource information is M, where M is a pre-specified integer, and M is equal to $N_{NB}^{index}$, or M is equal to 3, or M is equal to 4, where $N_{NB}^{index}$ is a quantity of bits required to indicate all narrowbands in the uplink bandwidth;

the processing module is further configured to send the random access response by using the sending module; and the processing module is further configured to receive the message 3 by using the receiving module.

According to a nineteenth aspect, an embodiment of this application provides a communications device, including a receiving module, a processing module, and a sending module, where the processing module is configured to: when the communications device is at a coverage enhancement level 2 or a coverage enhancement level 3, or in coverage enhancement mode B, receive a random access response by using the receiving module, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the communications device to send the message 3 on a first narrowband in an uplink bandwidth, and the repetition quantity information is used to indicate a quantity of times that the communications device is to repeatedly send the message 3; and when the indication information indicates that the message 3 to be sent by the communications device is the first message 3, a quantity of bits of the first resource information is 3; or when the indication information indicates that the message 3 to be sent by the communications device is the second message 3, a quantity of bits of the first resource information is K, where K is a pre-specified positive integer, and K is greater than 3; and the processing module is configured to send the message 3 based on the indication information, the first resource information, and the repetition quantity information by using the sending module.

According to a twentieth aspect, an embodiment of this application provides a network device, including a sending module, a processing module, and a receiving module, where the processing module is configured to: when a communications device is at a coverage enhancement level 2 or a coverage enhancement level 3, or in coverage enhancement mode B, generate a random access response, where the random access response includes indication information and uplink grant information, the indication information is used to indicate that a message 3 to be sent by the communications device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the communications device to send the message 3 on a first narrowband in an uplink bandwidth, and the repetition quantity information is used to indicate a quantity of times that the communications device is to repeatedly send the message 3; and when the indication information indicates that the message 3 to be sent by the communications device is the first message 3, a quantity of bits of the first resource information is 3; or when the indication information indicates that the message 3 to be sent by the communications device is the second message 3, a quantity of bits of the first resource information is K, where K is a pre-specified positive integer, and K is greater than 3;

the processing module is further configured to send the random access response by using the sending module; and the processing module is further configured to receive the message 3 by using the receiving module.

According to a twenty-first aspect, an embodiment of this application provides a computer-readable storage medium. The computer-readable storage medium stores an instruction, and when the instruction is run on a computer, the computer is enabled to perform the methods according to the foregoing aspects.

According to a twenty-second aspect, an embodiment of this application provides a computer program product including an instruction. When the computer program product is run on a computer, the computer is enabled to perform the methods according to the foregoing aspects.

According to a twenty-third aspect, an embodiment of this application provides a communications device. The communications device may include an entity such as a terminal device or a chip. The communications device includes a processor and a memory. The memory is configured to store an instruction, and the processor is configured to execute the instruction in the memory, so that the communications device performs the foregoing method performed by the communications device.

According to a twenty-fourth aspect, an embodiment of this application provides a network device. The network device may include an entity such as a base station or a chip. The network device includes a processor and a memory. The memory is configured to store an instruction, and the processor is configured to execute the instruction in the memory, so that the network device performs the foregoing method performed on a side of the network device.

According to a twenty-fifth aspect, this application provides a chip system. The chip system includes a processor and is configured to support a network device in implementing a function in the foregoing aspect, for example, sending or processing data and/or information in the foregoing method. In a possible design, the chip system further includes a memory, and the memory is configured to store a program instruction and data that are necessary for the network device. The chip system may include a chip, or may include a chip and another discrete component.

DESCRIPTION OF EMBODIMENTS

Figure 1:
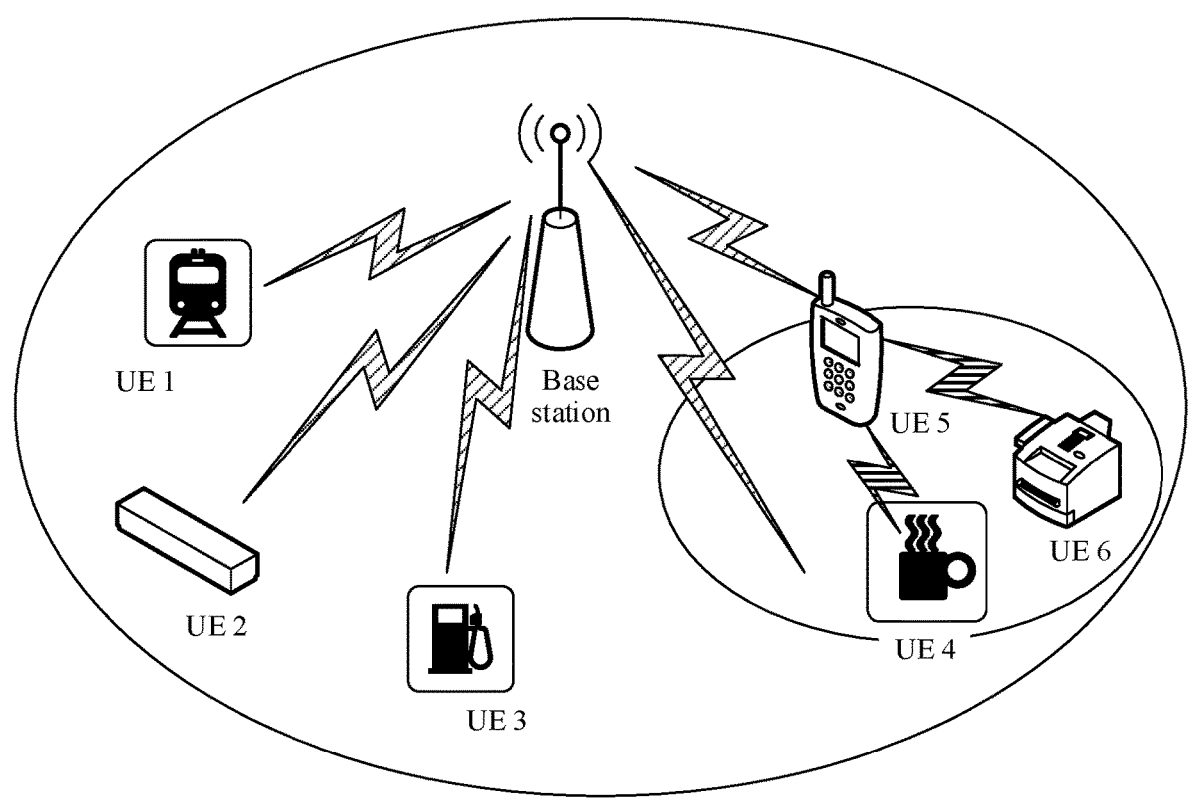
FIG. 1 is a schematic diagram of a system architecture of an information transmission method according to an embodiment of this application.

Embodiments of this application provide an information transmission method, a terminal device, and a network device, to improve transmission performance of the network device.

The following describes the embodiments of this application with reference to accompanying drawings.

In the specification, the claims, and the accompanying drawings of this application, the terms "first", "second", and the like are intended to distinguish between similar objects but do not necessarily indicate a specific order or sequence. It should be understood that the terms used in such a way are interchangeable in appropriate circumstances, and this is merely a discrimination manner for describing objects having a same attribute in the embodiments of this application. In addition, the terms "include", "have" and any other variants are intended to cover non-exclusive inclusion, so that a process, method, system, product, or device that includes a series of units is not necessarily limited to those units, but may include other units not expressly listed or inherent to the process, method, product, or device.

Technical solutions in the embodiments of the present invention can be applied to various communications systems for data processing, for example, a code division multiple access (CDMA) system, a time division multiple access (TDMA) system, a frequency division multiple access (FDMA) system, an orthogonal frequency division multiple access (OFDMA) system, a single carrier frequency division multiple access (single carrier FDMA, SC-FDMA) system, and another system. The terms "system" and "network" can be interchanged with each other. The CDMA system can implement radio technologies such as universal terrestrial radio access (UTRA) and CDMA2000. UTRA may include a wideband CDMA (WCDMA) technology and another variation technology of CDMA. CDMA2000 may cover interim standard (IS) 2000 (IS-2000), IS-95, and IS-856 standards. The TDMA system can implement wireless technologies such as global system for mobile communications (GSM). The OFDMA system can implement wireless technologies such as evolved universal terrestrial radio access (evolved UTRA, E-UTRA), ultra mobile broadband (UMB), IEEE 802.11 (Wi-Fi), IEEE 802.16 (WiMAX), IEEE 802.20, and Flash OFDMA. UTRA corresponds to UMTS, and E-UTRA corresponds to an evolved version of UMTS. A new version of UMTS that uses E-UTRA is used in 3GPP long term evolution (LTE) and various versions evolved based on LTE. A 5th generation ("5G" for short) communications system or new radio ("NW" for short) is a next generation communications system under research. In addition, the communications system is further applicable to a future-oriented communications technology, and is applicable to the technical solutions provided in the embodiments of the present invention. A system architecture and a service scenario that are described in the embodiments of the present invention are intended to describe the technical solutions in the embodiments of the present invention more clearly, and do not constitute any limitation on the technical solutions provided in the embodiments of the present invention. A person of ordinary skill in the art may know that with evolution of a network architecture and emergence of a new service scenario, the technical solutions provided in the embodiments of the present invention are also applicable to similar technical problems.

FIG. 1 is a schematic structural diagram of a possible radio access network (RAN for short) according to an embodiment of this application. The RAN may be a base station access system of a 2G network (to be specific, the RAN includes a base station and a base station controller), may be a base station access system of a 3G network (to be specific, the RAN includes a base station and an RNC), may be a base station access system of a 4G network (to be specific, the RAN includes an eNB and an RNC), or may be a base station access system of a 5G network.

The RAN includes one or more network devices 20. The network device 20 may be any type of device having wireless transmission and reception functions, or a chip disposed in a device having wireless transmission and reception functions. The network device 20 includes but is not limited to a base station (for example, a base station BS, a NodeB NodeB, an evolved NodeB eNodeB or eNB, a gNodeB gNodeB or gNB in a fifth generation 5G communications system, a base station in a future communications system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies, or a future evolved network. A core network may support a network using the foregoing one or more technologies, or a future evolved network. The base station may include one or more co-site or non-co-site transmission reception points (TRP). The network device 20 may alternatively be a radio controller, a centralized unit (CU), a distributed unit (DU), or the like in a cloud radio access network (CRAN) scenario. The network device may alternatively be a server, a wearable device, a vehicle-mounted device, or the like. An example in which the network device 20 is a base station is used for description below. The plurality of network devices 20 may be base stations of a same type or base stations of different types. The base station may communicate with terminal devices 1 to 6, or may communicate with terminal devices 1 to 6 through a relay station. The terminal devices 1 to 6 may support communication with a plurality of base stations using different technologies. For example, the terminal device may support communication with a base station supporting an LTE network, may support communication with a base station supporting a 5G network, or may support dual connections to a base station in an LTE network and a base station in a 5G network. For example, the terminal is connected to a radio access network (RAN) node of a wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a base band unit (BBU), or a wireless fidelity (Wi-Fi) access point (AP). In a network structure, the network device may include a centralized unit (CU) node, a distributed unit (DU) node, or a RAN device including a CU node and a DU node.

The terminal devices 1 to 6 each are also referred to as user equipment (UE), a mobile station (MS), a mobile terminal (MT), a terminal, or the like, and is a device that provides voice and/or data connectivity for a user, or is a chip, for example, a handheld device or a vehicle-mounted device having a wireless connection function, disposed in the device. Currently, for example, the terminal device is a mobile phone, a tablet, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home.

In the embodiments of this application, a communications system includes the base station and the UE 1 to the UE 6. In the communications system, the base station sends one or more of system information, a RAR message, or a paging message to one or more of the UE 1 to the UE 6. In addition, a communications system also includes the UE 4 to the UE 6. In the communications system, the UE 5 may function as a base station, and the UE 5 may send one or more of system information, control information, or a paging message to one or more of the UE 4 to the UE 6.

Figure 2:
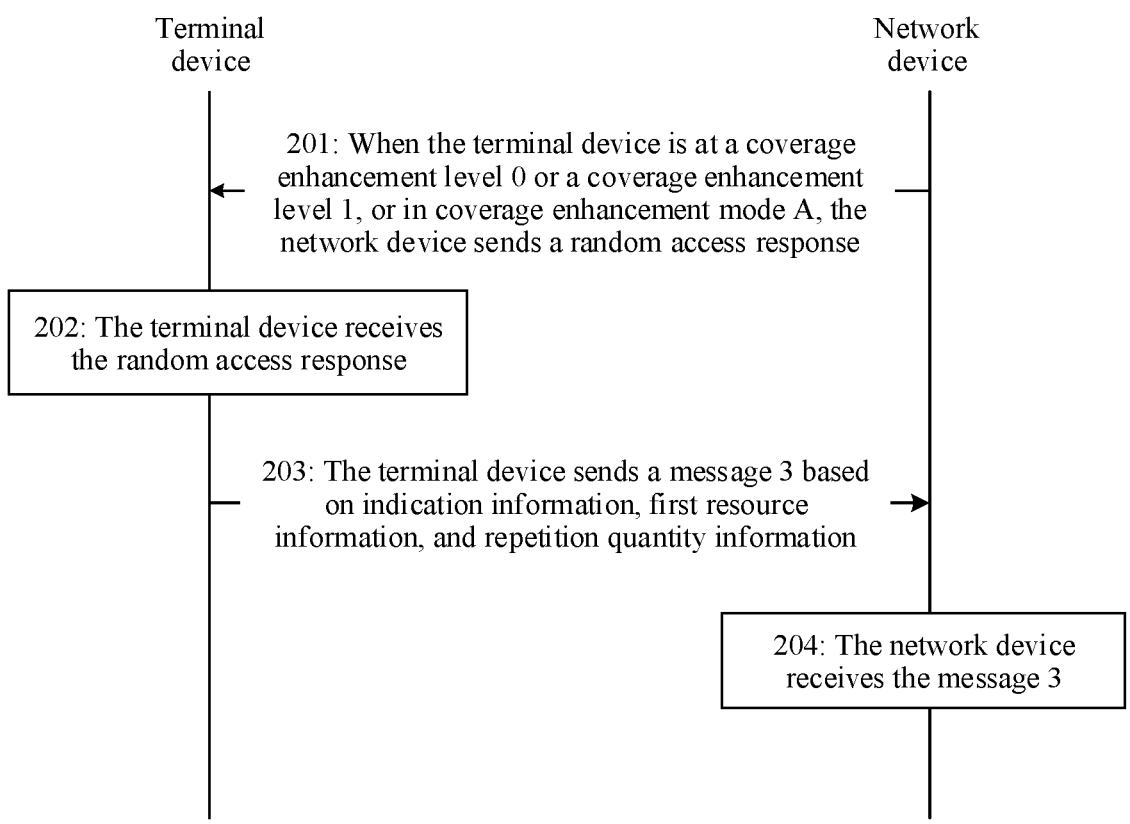
FIG. 2 is a schematic diagram of an interaction procedure between a terminal device and a network device according to an embodiment of this application.

FIG. 2 is a schematic diagram of an interaction procedure between a network device and a terminal device according to an embodiment of this application. An information transmission method provided in this embodiment of this application mainly includes the following steps.

201: When the terminal device is at a coverage enhancement level 0 or a coverage enhancement level 1, or in coverage enhancement mode A, the network device sends a random access response.

The random access response includes indication information and uplink grant information, and the uplink grant information includes first resource information and repetition quantity information.

The indication information is used to indicate that a message 3 to be sent by the terminal device is a first message 3 or a second message 3, the first message 3 is a message 3 that does not carry user data, and the second message 3 is a message 3 that carries the user data.

The first resource information is used to indicate a resource used by the terminal device to send the message 3 on a first narrowband in an uplink bandwidth, and the repetition quantity information is used to indicate a quantity of times that the terminal device repeatedly sends the message 3; and if the uplink bandwidth of the terminal device is 1.4 megahertz (MHz), when the indication information indicates that the message 3 to be sent by the terminal device is the first message 3, a quantity of bits of the uplink grant information is 20; or when the indication information indicates that the message 3 to be sent by the terminal device is the second message 3, a quantity of bits of the uplink grant information is 12.

In this embodiment of this application, the network device may send a medium access control protocol (MAC) random access response (RAR) to the terminal device, and the random access response includes indication information and uplink grant information. The indication information is used to indicate that a message 3 to be sent by the terminal device is a first message 3 or a second message 3, and the message 3 is a third message (which may also be referred to as a Msg3) transmitted by the terminal device. The message 3 refers to a third message in a random access process, and the message 3 may carry user data. For example, the message 3 may support early data transmission (EDT). Corresponding resources may be separately configured for a plurality of types of messages that can be sent by the terminal device. For example, messages 3 in a random access process may be classified into at least two different types, for example, a first message 3 and a second message 3. Therefore, the terminal device may send two different types of messages 3, and the network device may separately configure corresponding resources for sending different messages 3. For example, the first message 3 is a message 3 that does not carry user data, and the first message 3 may also be referred to as a legacy message 3 (legacy Msg3); the second message 3 is a message 3 that carries the user data, and the second message 3 may also be referred to as an EDT Msg3. For example, the first message 3 may be a message 3 for normal transmission. For another example, the first message 3 may be a message 3 for which data transmission is not performed early. For example, the second message 3 is a message 3 for which data transmission is performed early.

The uplink grant information includes first resource information and repetition quantity information. For example, the network device allocates specific resources based on different messages 3 sent by the terminal device. For example, the network device may allocate, to the terminal device, a quantity of resource blocks (RB) and a start resource block index that are used for the first message 3, or the network device may allocate, to the terminal device, a quantity of resource blocks and a start resource block index that are used for the second message 3.

In this embodiment of this application, if an uplink bandwidth of the terminal device is 1.4 MHz; and when the indication information indicates that the message 3 to be sent by the terminal device is the first message 3, a quantity of bits of the uplink grant information is 20; or when the indication information indicates that the message 3 to be sent by the terminal device is the second message 3, a quantity of bits of the uplink grant information is 12.

The mode A or a mode B of the terminal device is a classification of coverage enhancement (CE) modes in connected mode, a CE level 0/1/2/3 is a coverage enhancement level in idle mode, the mode A corresponds to the CE level 0/1, and the mode B corresponds to the CE level 2/3.

For the mode A, when a system bandwidth is 1.4 MHz, because there is only one narrowband in the system bandwidth, the narrowband does not need to be indicated. Therefore, a total of nine bits may be released, and the released nine bits may include three bits of an MCS field, two bits of an Msg3/4 MPDCCH narrowband index field, and four bits of a padding bit (Zero padding) field. Therefore, in this case, one byte, namely, eight bits, of the MAC RAR may be reduced, so that the MAC RAR may be reduced from 20 bits to 12 bits. In this case, to be compatible with a new RAR and a legacy RAR, the network device places the legacy RAR in front of the new RAR in a MAC PDU. In this embodiment of this application, a quantity of bits of the MAC RAR is reduced without affecting flexibility of the MAC RAR, thereby improving transmission performance of the MAC RAR.

In some embodiments of this application, no bit in the uplink grant information indicates an index of a narrowband, and the narrowband is used by the terminal device to receive a physical downlink control channel; a quantity of bits of a modulation and coding scheme field in the uplink grant information is 1; and there is no padding bit in the uplink grant information; or no bit in the uplink grant information indicates a modulation and coding scheme field, and there is no padding bit in the uplink grant information; or no bit in the uplink grant information indicates an index of a narrowband, and the narrowband is used by the terminal device to receive a physical downlink control channel; no bit in the uplink grant information indicates a modulation and coding scheme; and a quantity of padding bits in the uplink grant information is 1; and the physical downlink control channel is used for scheduling of the message 3 or a message 4.

For example, no bit in the uplink grant information indicates the index of the narrowband. For example, the uplink grant information does not include a field indicating the index of the narrowband. For example, in mode A and in the bandwidth of 1.4 MHz, the uplink grant information does not include a Msg3 PUSCH narrowband index field, so that $N_{NB}^{index}$ bits may be saved; the uplink grant information does not include a Msg3/4 MPDCCH narrowband index field, so that two bits are saved; the modulation and coding scheme field in the uplink grant information is reduced from three bits to one bit, so that two bits are saved; in addition, there is no padding bit in the uplink grant information. Therefore, eight bits are saved. Therefore, the eight bits are released from the uplink grant information, and the released bits are used to indicate a more flexible narrowband index.

For another example, a Msg3 PUSCH narrowband index field has only one bit; no bit in the uplink grant information indicates the modulation and coding scheme field, so that three bits are saved; there is no padding bit in the uplink grant information, so that $4-N_{NB}^{index}$ are saved. Therefore, eight bits are released from the uplink grant information, and the released bits are used to indicate a more flexible narrowband index.

For another example, no bit in the uplink grant information indicates the index of the narrowband. For example, the uplink grant information does not include a Msg3 PUSCH narrowband index field, so that $N_{NB}^{index}$ bits may be saved; the uplink grant information does not include a Msg3/4 MPDCCH narrowband index field, so that two bits are saved; no bit in the uplink grant information indicates the modulation and coding scheme, so that three bits are saved; in mode A, the quantity of padding bits in the uplink grant information is reduced from $4-N_{NB}^{index}$ to one bit, so that $3-N_{NB}^{index}$ bits are saved. Therefore, eight bits are released from the uplink grant information, and the released bits are used to indicate a more flexible narrowband index.

202: When the terminal device is at the coverage enhancement level 0 or the coverage enhancement level 1, or in coverage enhancement mode A, the terminal device receives the random access response, where the random access response includes the indication information and the uplink grant information.

The terminal device may determine, as indicated by the indication information, that the message 3 to be sent by the terminal device is the first message 3 or the second message 3, the first message 3 is a message 3 that does not carry the user data, and the second message 3 is a message 3 that carries the user data. In addition, the terminal device may determine, by using the first resource information in the uplink grant information, the resource used by the terminal device to send the message 3 on the first narrowband in the uplink bandwidth, and the terminal device may determine, by using the repetition quantity information in the uplink grant information, the quantity of times that the terminal device repeatedly sends the message 3.

Specifically, if the uplink bandwidth of the terminal device is 1.4 MHz; and when the indication information indicates that the message 3 to be sent by the terminal device is the first message 3, the terminal device determines that the quantity of bits of the uplink grant information is 20; or when the indication information indicates that the message 3 to be sent by the terminal device is the second message 3, the terminal device determines that the quantity of bits of the uplink grant information is 12.

203: The terminal device sends the message 3 based on the indication information, the first resource information, and the repetition quantity information.

In this embodiment of this application, after obtaining the indication information, the first resource information, and the repetition quantity information by using the random access response, the terminal device determines a type of the to-be-sent message 3 by using the indication information, may determine, by using the first resource information, the resource used to send the message 3, and determines, by using the repetition quantity information, the quantity of times that the terminal device needs to repeatedly send the message 3, and then the terminal device may send the message 3 to the network device, for example, send the message 3 through a wireless network. For example, if the indication information indicates that first data is the first message 3, the terminal device may send the first message 3 based on currently received scheduling information; or if the indication information indicates that first data is the second message 3, the terminal device may send the second message 3 based on currently received scheduling information.

204: The network device receives the message 3.

In this embodiment of this application, the terminal device transmits the message 3 based on the indication information, the first resource information, and the repetition quantity information, and the network device may receive, based on the indication information, the first resource information, and the repetition quantity information, the message 3 sent by the terminal device. For example, if the indication information indicates that the message 3 is the first message 3, the terminal device may send the first message 3, and the network device may receive the first message 3 sent by the terminal device; or if the indication information indicates that the message 3 is the second message 3, the terminal device may send the second message 3, and the network device may receive the second message 3 sent by the terminal device.

In this embodiment of this application, the random access response sent by the network device includes the indication information and the uplink grant information, the indication information may indicate that the message 3 to be sent by the terminal device is the first message 3 or the second message 3, and the uplink grant information includes the first resource information and the repetition quantity information; and if the uplink bandwidth of the terminal device is 1.4 megahertz MHz, when the indication information indicates that the message 3 to be sent by the terminal device is the first message 3, the quantity of bits of the uplink grant information is 20; or when the indication information indicates that the message 3 to be sent by the terminal device is the second message 3, the quantity of bits of the uplink grant information is 12. Therefore, the uplink grant information used when the terminal device sends the second message 3 is eight bits less than the uplink grant information used when the terminal device sends the first message 3, thereby improving the transmission performance of the MAC RAR.

Figure 3:
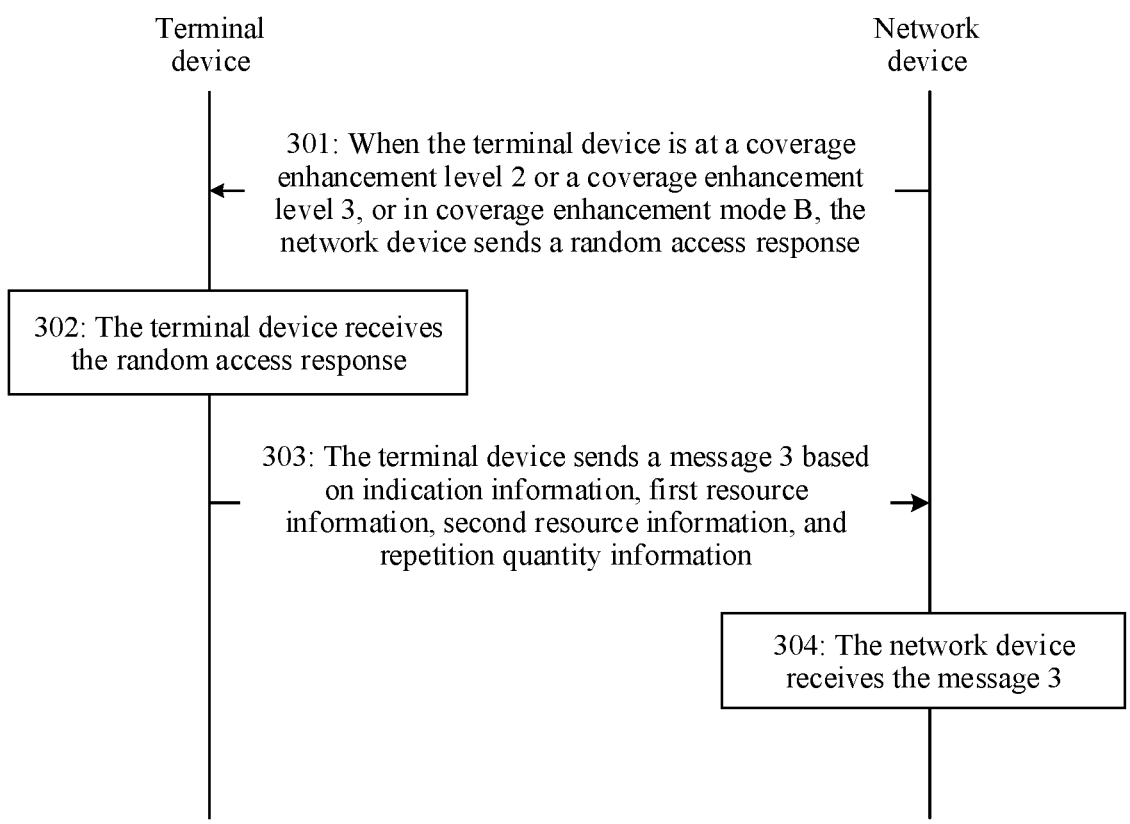
FIG. 3 is a schematic diagram of another interaction procedure between a terminal device and a network device according to an embodiment of this application.

FIG. 3 is a schematic diagram of another interaction procedure between a network device and a terminal device according to an embodiment of this application. An information transmission method provided in this embodiment of this application mainly includes the following steps.

301: When the terminal device is at a coverage enhancement level 2 or a coverage enhancement level 3, or in coverage enhancement mode B, the network device sends a random access response.

The random access response includes indication information and uplink grant information, and the uplink grant information includes first resource information and repetition quantity information.

The indication information is used to indicate that a message 3 to be sent by the terminal device is a first message 3 or a second message 3, the first message 3 is a message 3 that does not carry user data, and the second message 3 is a message 3 that carries the user data.

The uplink grant information includes first resource information, second resource information, and repetition quantity information, the first resource information is used to indicate a resource used by the terminal device to send the message 3 on a first narrowband in an uplink bandwidth, the repetition quantity information is used to indicate a quantity of times that the terminal device is to repeatedly send the message 3, and the second resource information is used to indicate an index of the first narrowband of the terminal device in the uplink bandwidth; and when the indication information indicates that the message 3 to be sent by the terminal device is the first message 3, a quantity of bits of the second resource information is 2; or when the indication information indicates that the message 3 to be sent by the terminal device is the second message 3, a quantity of bits of the second resource information is N, where N is a pre-specified integer, and a value of N is one of the following values: $N_{NB}^{index}$, 3, and 4, where $N_{NB}^{index}$ is a quantity of bits required to indicate all narrowbands in the uplink bandwidth.

In this embodiment of this application, the network device may send a random access response to the terminal device, and the random access response includes indication information and uplink grant information. The indication information is used to indicate that a message 3 to be sent by the terminal device is a first message 3 or a second message 3, and the message 3 is a third message (which may also be referred to as a Msg3) transmitted by the terminal device. The message 3 refers to a third message in a random access process, and the message 3 may carry user data. For example, the message 3 may support early data transmission (EDT). Corresponding resources may be separately configured for a plurality of types of messages that can be sent by the terminal device. For example, messages 3 in a random access process may be classified into at least two different types, for example, a first message 3 and a second message 3. Therefore, the terminal device may send two different types of messages 3, and the network device may separately configure corresponding resources for sending different messages 3. For example, the first message 3 is a message 3 that does not carry user data, and the first message 3 may also be referred to as a legacy message 3 (legacy Msg3); the second message 3 is a message 3 that carries the user data, and the second message 3 may also be referred to as an EDT Msg3. For example, the first message 3 may be a message 3 for normal transmission. For another example, the first message 3 may be a message 3 for which data transmission is not performed early. For example, the second message 3 is a message 3 for which data transmission is performed early.

The uplink grant information includes first resource information and repetition quantity information. For example, the network device allocates specific resources based on different messages 3 sent by the terminal device. For example, the network device may allocate, to the terminal device, a quantity of resource blocks (RB) and a start resource block index that are used for the first message 3, or the network device may allocate, to the terminal device, a quantity of resource blocks and a start resource block index that are used for the second message 3.

The uplink grant information further includes second resource information, used to indicate an index of a first narrowband of the terminal device in an uplink bandwidth; and when the indication information indicates that the message 3 to be sent by the terminal device is the first message 3, a quantity of bits of the second resource information is 2; or when the indication information indicates that the message 3 to be sent by the terminal device is the second message 3, a quantity of bits of the second resource information is N, where N is a pre-specified integer, and N is equal to $N_{NB}^{index}$, or N is equal to 3, or N is equal to 4, where $N_{NB}^{index}$ is a quantity of bits required to indicate all narrowbands in the uplink bandwidth.

In this embodiment of this application, the second resource information used when the terminal device sends the second message 3 is different from the second resource information used when the terminal device sends the first message 3. When the message 3 to be sent by the terminal device is the first message 3, the quantity of bits of the second resource information is 2. In this case, indexes of a maximum of four narrowbands in a system bandwidth can be indicated.

For example, for the mode B, a Msg3 PUSCH narrowband is determined according to the following Table 6.2-A.

| Msg3 narrowband index | Msg3 PUSCH narrowband |
|---|---|
| 00 | $NB_{RAR} \bmod N_{NB}$ |
| 01 | $(NB_{RAR} + 1) \bmod N_{NB}$ |
| 10 | $(NB_{RAR} + 2) \bmod N_{NB}$ |
| 11 | $(NB_{RAR} + 3) \bmod N_{NB}$ |

$N_{NB}$ represents a quantity of narrowbands in the system bandwidth, and $NB_{RAR}$ is a parameter notified by using higher layer signaling.

When the message 3 to be sent by the terminal device is the second message 3, the quantity of bits of the second resource information is N. A value of N may be one of the following values: For example, N is equal to $N_{NB}^{index}$, or N is equal to 3, or N is equal to 4. When the message 3 to be sent by the terminal device is the second message 3, for example, N is equal to $N_{NB}^{index}$, $N_{NB}^{index}$ is a narrowband-related parameter, and, $N_{NB}^{index} = \lceil \log_2(N_{NB}) \rceil$, where $N_{NB}^{index}$ represents a quantity of bits used to indicate an index of a narrowband, $N_{NB}^{index} = \lfloor N_{RB}^{UL}/6 \rfloor$, $N_{NB}$ represents the quantity of narrowbands in the system bandwidth, and $N_{RB}^{UL}$ represents a quantity of RBs in the uplink system bandwidth. When the system bandwidth is equal to 10 MHz, $N_{NB}^{index}=3$. In this case, three bits can indicate an index of any narrowband in the 10-MHz system bandwidth, so that the second resource information can indicate more narrowband indexes. Therefore, scheduling flexibility of the network device can be improved.

302: When the terminal device is at the coverage enhancement level 2 or the coverage enhancement level 3, or in coverage enhancement mode B, the terminal device receives the random access response.

The random access response includes the indication information and the uplink grant information. The indication information is used to indicate that the message 3 to be sent by the terminal device is the first message 3 or the second message 3, the first message 3 is a message 3 that does not carry the user data, and the second message 3 is a message 3 that carries the user data.

The uplink grant information includes the first resource information, the second resource information, and the repetition quantity information, the first resource information is used to indicate the resource used by the terminal device to send the message 3 on the first narrowband in the uplink bandwidth, the repetition quantity information is used to indicate the quantity of times that the terminal device is to repeatedly send the message 3, and the second resource information is used to indicate the index of the first narrowband of the terminal device in the uplink bandwidth; and when the indication information indicates that the message 3 to be sent by the terminal device is the first message 3, the quantity of bits of the second resource information is 2; or when the indication information indicates that the message 3 to be sent by the terminal device is the second message 3, the quantity of bits of the second resource information is N, where N is a pre-specified integer, and N is equal to $N_{NB}^{index}$, or N is equal to 3, or N is equal to 4, where $N_{NB}^{index}$ is the quantity of bits required to indicate all the narrowbands in the uplink bandwidth.

303: The terminal device sends the message 3 based on the indication information, the first resource information, the second resource information, and the repetition quantity information.

In this embodiment of this application, after obtaining the indication information, the first resource information, the second resource information, and the repetition quantity information by using the random access response, the terminal device determines a type of the to-be-sent message 3 by using the indication information, may determine, by using the first resource information, the resource used to send the message 3, and determines, by using the repetition quantity information, the quantity of times that the terminal device needs to repeatedly send the message 3, and then the terminal device may send the message 3 to the network device, for example, send the message 3 through a wireless network. For example, if the indication information indicates that first data is the first message 3, the terminal device may send the first message 3 based on currently received scheduling information; or if the indication information indicates that first data is the second message 3, the terminal device may send the second message 3 based on currently received scheduling information.

304: The network device receives the message 3.

In this embodiment of this application, the terminal device transmits the message 3 based on the indication information, the first resource information, the second resource information, and the repetition quantity information, and the network device may receive, based on the indication information, the first resource information, the second resource information, and the repetition quantity information, the message 3 sent by the terminal device. For example, if the indication information indicates that the message 3 is the first message 3, the terminal device may send the first message 3, and the network device may receive the first message 3 sent by the terminal device; or if the indication information indicates that the message 3 is the second message 3, the terminal device may send the second message 3, and the network device may receive the second message 3 sent by the terminal device.

In this embodiment of this application, the random access response sent by the network device includes the indication information and the uplink grant information, the indication information may indicate that the message 3 to be sent by the terminal device is the first message 3 or the second message 3, and the uplink grant information includes the first resource information, the second resource information, and the repetition quantity information. The second resource information used when the terminal device sends the second message 3 is different from the second resource information used when the terminal device sends the first message 3. When the message 3 to be sent by the terminal device is the first message 3, the quantity of bits of the second resource information is 2; or when the message 3 to be sent by the terminal device is the second message 3, the quantity of bits of the second resource information is N. For example, N is equal to $N_{NB}^{index}$, where $N_{NB}^{index}$ is the narrowband-related parameter, $N_{NB}^{index} = \lceil \log_2(N_{NB}) \rceil$, $N_{NB}^{index}$ represents the quantity of bits used to indicate the index of the narrowband, $N_{NB} = \lfloor N_{RB}^{UL}/6 \rfloor$, $N_{NB}$ represents the quantity of narrowbands in the system bandwidth, and $N_{RB}^{UL}$ represents the quantity of RBs in the uplink system bandwidth. When the system bandwidth is equal to 10 MHz, $N_{NB}^{index}=3$. In this case, three bits can indicate the index of any narrowband in the 10-MHz system bandwidth, so that the second resource information can indicate more narrowband indexes. Therefore, the scheduling flexibility of the network device can be improved.

Figure 4:
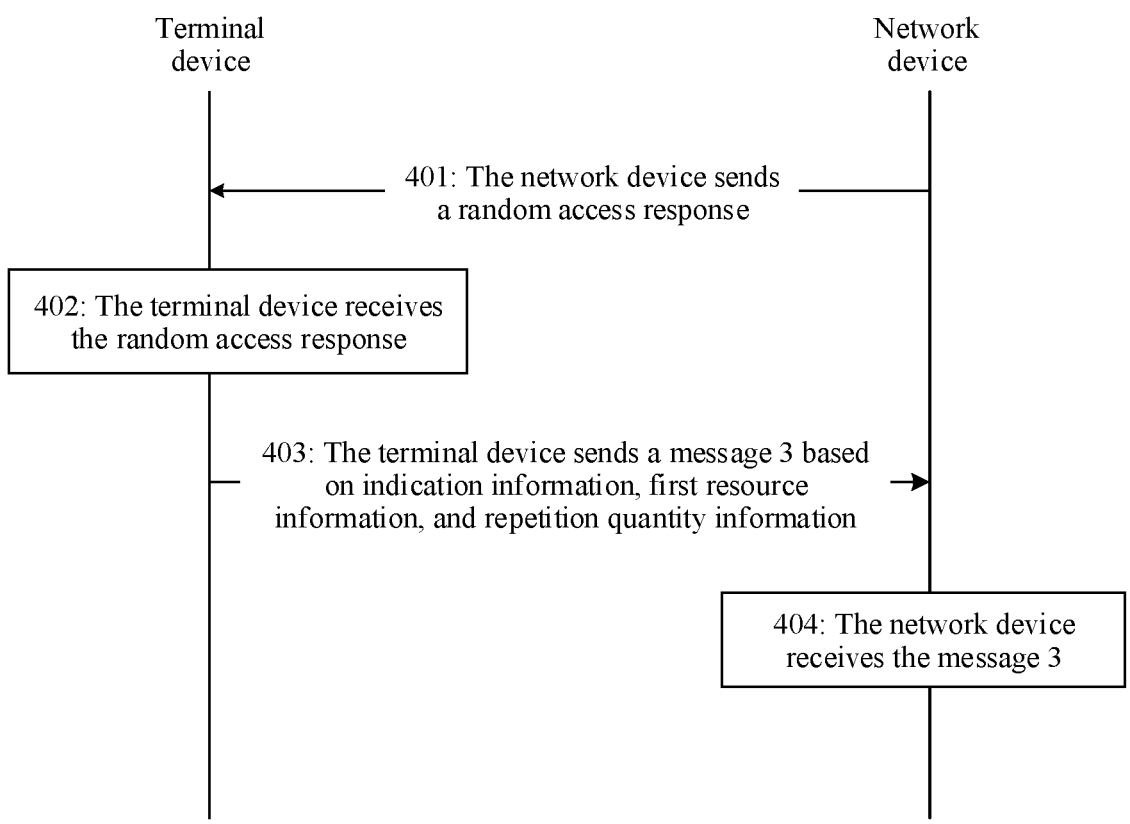
FIG. 4 is a schematic diagram of another interaction procedure between a terminal device and a network device according to an embodiment of this application.

FIG. 4 is a schematic diagram of another interaction procedure between a network device and a terminal device according to an embodiment of this application. An information transmission method provided in this embodiment of this application mainly includes the following steps.

401: When the terminal device is at a coverage enhancement level 0 or a coverage enhancement level 1, or in coverage enhancement mode A, the network device sends a random access response.

The random access response includes indication information and uplink grant information. The indication information is used to indicate that a message 3 to be sent by the terminal device is a first message 3 or a second message 3, the first message 3 is a message 3 that does not carry user data, and the second message 3 is a message 3 that carries the user data.

The uplink grant information includes first resource information and repetition quantity information, the first resource information is used to indicate a resource used by the terminal device to send the message 3 on a first narrowband in an uplink bandwidth, and the repetition quantity information is used to indicate a quantity of times that the terminal device is to repeatedly send the message 3; and when the indication information indicates that the message 3 to be sent by the terminal device is the first message 3, a quantity of bits of the first resource information is 4; or when the indication information indicates that the message 3 to be sent by the terminal device is the second message 3, a quantity of bits of the first resource information is L, where L is a pre-specified positive integer, and L is greater than 4.

The first resource information used when the terminal device sends the second message 3 is different from the first resource information used when the terminal device sends the first message 3. When the message 3 to be sent by the terminal device is the first message 3, the quantity of bits of the first resource information is 4. For example, when the terminal device is in mode A, four bits are used to indicate an allocated resource in an uplink resource allocation type 0 manner. A resource indication value (RIV) in the uplink resource allocation type 0 manner is defined as follows:

if $(L_{CRBs}-1) \leq \lfloor N_{RB}^{UL}/2 \rfloor$, $RIV = N_{RB}^{UL}(L_{CRBs}-1) + RB_{START}$, else $RIV = N_{RB}^{UL}(N_{RB}^{UL} - L_{CRBs} + 1) + (N_{RB}^{UL} - 1 - RB_{START})$.

Figure 5:
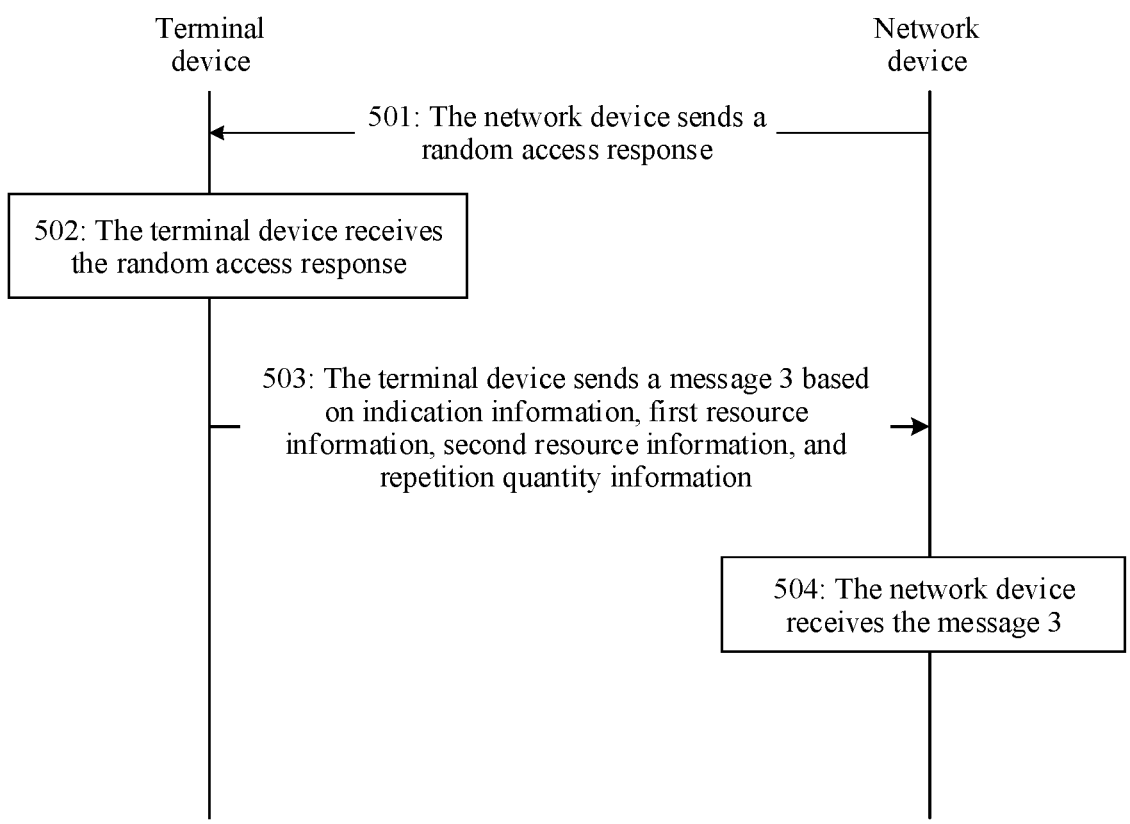
FIG. 5 is a schematic diagram of another interaction procedure between a terminal device and a network device according to an embodiment of this application.

$N_{RB}^{UL} = 6$, where $RB_{START}$ represents a start resource block, $L_{CRBs} \geq 1$ represents a length of an allocated resource block, and RIV is a resource indication value indicated by a 4-bit resource allocation field. A type-0 resource indication of a Msg3 of BL/CE UE at the coverage level A is shown in FIG. 5. Because the field "Msg3 PUSCH resource allocation" includes four bits, and can indicate 16 states, a possible quantity of allocated PRBs is 1, 2, 3, or 6.

When the message 3 to be sent by the terminal device is the second message 3, the quantity of bits of the first resource information is L, where L is greater than 4. In this case, more resource allocation types can be indicated. When the message 3 to be sent by the terminal device is the second message 3, the first resource information may indicate more types of resources for sending the message 3 on the first narrowband, thereby improving scheduling flexibility of the network device.

402: When the terminal device is at the coverage enhancement level 0 or the coverage enhancement level 1, or in coverage enhancement mode A, the terminal device receives the random access response. The random access response includes the indication information and the uplink grant information, the indication information is used to indicate that the message 3 to be sent by the terminal device is the first message 3 or the second message 3, the first message 3 is a message 3 that does not carry the user data, and the second message 3 is a message 3 that carries the user data.

The uplink grant information includes the first resource information and the repetition quantity information, the first resource information is used to indicate the resource used by the terminal device to send the message 3 on the first narrowband in the uplink bandwidth, and the repetition quantity information is used to indicate the quantity of times that the terminal device is to repeatedly send the message 3; and when the indication information indicates that the message 3 to be sent by the terminal device is the first message 3, the quantity of bits of the first resource information is 4; or when the indication information indicates that the message 3 to be sent by the terminal device is the second message 3, the quantity of bits of the first resource information is L, where L is a pre-specified positive integer, and L is greater than 4.

403: The terminal device sends the message 3 based on the indication information, the first resource information, and the repetition quantity information.

In this embodiment of this application, after obtaining the indication information, the first resource information, and the repetition quantity information by using the random access response, the terminal device determines a type of the to-be-sent message 3 by using the indication information, may determine, by using the first resource information, the resource used to send the message 3, and determines, by using the repetition quantity information, the quantity of times that the terminal device needs to repeatedly send the message 3, and then the terminal device may send the message 3 to the network device, for example, send the message 3 through a wireless network. For example, if the indication information indicates that first data is the first message 3, the terminal device may send the first message 3 based on currently received scheduling information; or if the indication information indicates that first data is the second message 3, the terminal device may send the second message 3 based on currently received scheduling information.

404: The network device receives the message 3.

In this embodiment of this application, the terminal device transmits the message 3 based on the indication information, the first resource information, and the repetition quantity information, and the network device may receive, based on the indication information, the first resource information, and the repetition quantity information, the message 3 sent by the terminal device. For example, if the indication information indicates that the message 3 is the first message 3, the terminal device may send the first message 3, and the network device may receive the first message 3 sent by the terminal device; or if the indication information indicates that the message 3 is the second message 3, the terminal device may send the second message 3, and the network device may receive the second message 3 sent by the terminal device.

In this embodiment of this application, the random access response sent by the network device includes the indication information and the uplink grant information, the indication information may indicate that the message 3 to be sent by the terminal device is the first message 3 or the second message 3, and the uplink grant information includes the first resource information and the repetition quantity information. The first resource information used when the terminal device sends the second message 3 is different from the first resource information used when the terminal device sends the first message 3. When the message 3 to be sent by the terminal device is the first message 3, the quantity of bits of the first resource information is 4; or when the message 3 to be sent by the terminal device is the second message 3, the quantity of bits of the first resource information is L, where L is greater than 4. When the message 3 to be sent by the terminal device is the second message 3, the first resource information may indicate more types of resources for sending the message 3 on the first narrowband, thereby improving the scheduling flexibility of the network device.

FIG. 5 is a schematic diagram of another interaction procedure between a network device and a terminal device according to an embodiment of this application. An information transmission method provided in this embodiment of this application mainly includes the following steps.

501: The network device sends a random access response.

The random access response includes indication information and uplink grant information. The indication information is used to indicate that a message 3 to be sent by the terminal device is a first message 3 or a second message 3, the first message 3 is a message 3 that does not carry user data, and the second message 3 is a message 3 that carries the user data.

The uplink grant information includes first resource information, second resource information, and repetition quantity information, the first resource information is used to indicate a resource used by the terminal device to send the message 3 on a first narrowband in an uplink bandwidth, the repetition quantity information is used to indicate a quantity of times that the terminal device is to repeatedly send the message 3, and the second resource information is used to indicate an index of a narrowband, where the narrowband is used by the terminal device to receive a physical downlink control channel, and the physical downlink control channel is used for scheduling of the message 3 or a message 4; and when the indication information indicates that the message 3 to be sent by the terminal device is the first message 3, a quantity of bits of the second resource information is 2; or when the indication information indicates that the message 3 to be sent by the terminal device is the second message 3, a quantity of bits of the second resource information is M, where M is a pre-specified integer, and M is equal to $N_{NB}^{index}$, or M is equal to 3, or M is equal to 4, where $N_{NB}^{index}$ is a quantity of bits required to indicate all narrowbands in the uplink bandwidth. $N_{NB}^{index}$ is a narrowband-related parameter, $N_{NB}^{index}=\lceil \log_2(N_{NB}) \rceil$, $N_{NB}^{index}$ represents a quantity of bits used to indicate an index of a narrowband, $N_{NB}=\lfloor N_{RB}^{UL}/6 \rfloor$, $N_{NB}$ represents a quantity of narrowbands in a system bandwidth, and $N_{RB}^{UL}$ represents a quantity of RBs in the uplink system bandwidth. When the system bandwidth is equal to 10 MHz, $N_{NB}^{index}$3. In this case, three bits can indicate an index of any narrowband in the 10-MHz system bandwidth, so that the second resource information can indicate more narrowband indexes. Therefore, scheduling flexibility of the network device can be improved.

In this embodiment of this application, the second resource information used when the terminal device sends the second message 3 is different from the second resource information used when the terminal device sends the first message 3. When the message 3 to be sent by the terminal device is the first message 3, the quantity of bits of the second resource information is 2; or when the indication information indicates that the message 3 to be sent by the terminal device is the second message 3, the quantity of bits of the second resource information is M, where M is a pre-specified integer, and M is equal to $N_{NB}^{index}$, or M is equal to 3, or M is equal to 4. When the message 3 to be sent by the terminal device is the second message 3, the second resource information may indicate more types of indexes of the first narrowband, thereby improving the scheduling flexibility of the network device.

502: The terminal device receives the random access response.

The random access response includes the indication information and the uplink grant information. The indication information is used to indicate that the message 3 to be sent by the terminal device is the first message 3 or the second message 3, the first message 3 is a message 3 that does not carry the user data, and the second message 3 is a message 3 that carries the user data.

The uplink grant information includes the first resource information, the second resource information, and the repetition quantity information, the first resource information is used to indicate the resource used by the terminal device to send the message 3 on the first narrowband in the uplink bandwidth, the repetition quantity information is used to indicate the quantity of times that the terminal device is to repeatedly send the message 3, and the second resource information is used to indicate the index of the narrowband, where the narrowband is used by the terminal device to receive the physical downlink control channel, and the physical downlink control channel is used for scheduling of the message 3 or the message 4; and when the indication information indicates that the message 3 to be sent by the terminal device is the first message 3, the quantity of bits of the second resource information is 2; or when the indication information indicates that the message 3 to be sent by the terminal device is the second message 3, the quantity of bits of the second resource information is M, where M is a pre-specified integer, and M is equal to $N_{NB}^{index}$, or M is equal to 3, or M is equal to 4, where $N_{NB}^{index}$ is the quantity of bits required to indicate all the narrowbands in the uplink bandwidth.

503: The terminal device sends the message 3 based on the indication information, the first resource information, the second resource information, and the repetition quantity information.

In this embodiment of this application, after obtaining the indication information, the first resource information, the second resource information, and the repetition quantity information by using the random access response, the terminal device determines a type of the to-be-sent message 3 by using the indication information, may determine, by using the first resource information, the resource used to send the message 3, and determines, by using the repetition quantity information, the quantity of times that the terminal device needs to repeatedly send the message 3, and then the terminal device may send the message 3 to the network device, for example, send the message 3 through a wireless network. For example, if the indication information indicates that first data is the first message 3, the terminal device may send the first message 3 based on currently received scheduling information; or if the indication information indicates that first data is the second message 3, the terminal device may send the second message 3 based on currently received scheduling information.

504: The network device receives the message 3.

In this embodiment of this application, the terminal device transmits the message 3 based on the indication information, the first resource information, the second resource information, and the repetition quantity information, and the network device may receive, based on the indication information, the first resource information, the second resource information, and the repetition quantity information, the message 3 sent by the terminal device. For example, if the indication information indicates that the message 3 is the first message 3, the terminal device may send the first message 3, and the network device may receive the first message 3 sent by the terminal device; or if the indication information indicates that the message 3 is the second message 3, the terminal device may send the second message 3, and the network device may receive the second message 3 sent by the terminal device.

In this embodiment of this application, the random access response sent by the network device includes the indication information and the uplink grant information, the indication information may indicate that the message 3 to be sent by the terminal device is the first message 3 or the second message 3, and the uplink grant information includes the first resource information, the second resource information, and the repetition quantity information. The second resource information used when the terminal device sends the second message 3 is different from the second resource information used when the terminal device sends the first message 3. When the message 3 to be sent by the terminal device is the first message 3, the quantity of bits of the second resource information is 2; or when the indication information indicates that the message 3 to be sent by the terminal device is the second message 3, the quantity of bits of the second resource information is M, where M is a pre-specified integer, M is equal to $N_{NB}^{index}$, or M is equal to 3, or M is equal to 4, where $N_{NB}^{index}$ is the quantity of bits required to indicate all the narrowbands in the uplink bandwidth. When the message 3 to be sent by the terminal device is the second message 3, the second resource information may indicate more types of indexes of the first narrowband, thereby improving the scheduling flexibility of the network device.

Figure 6:
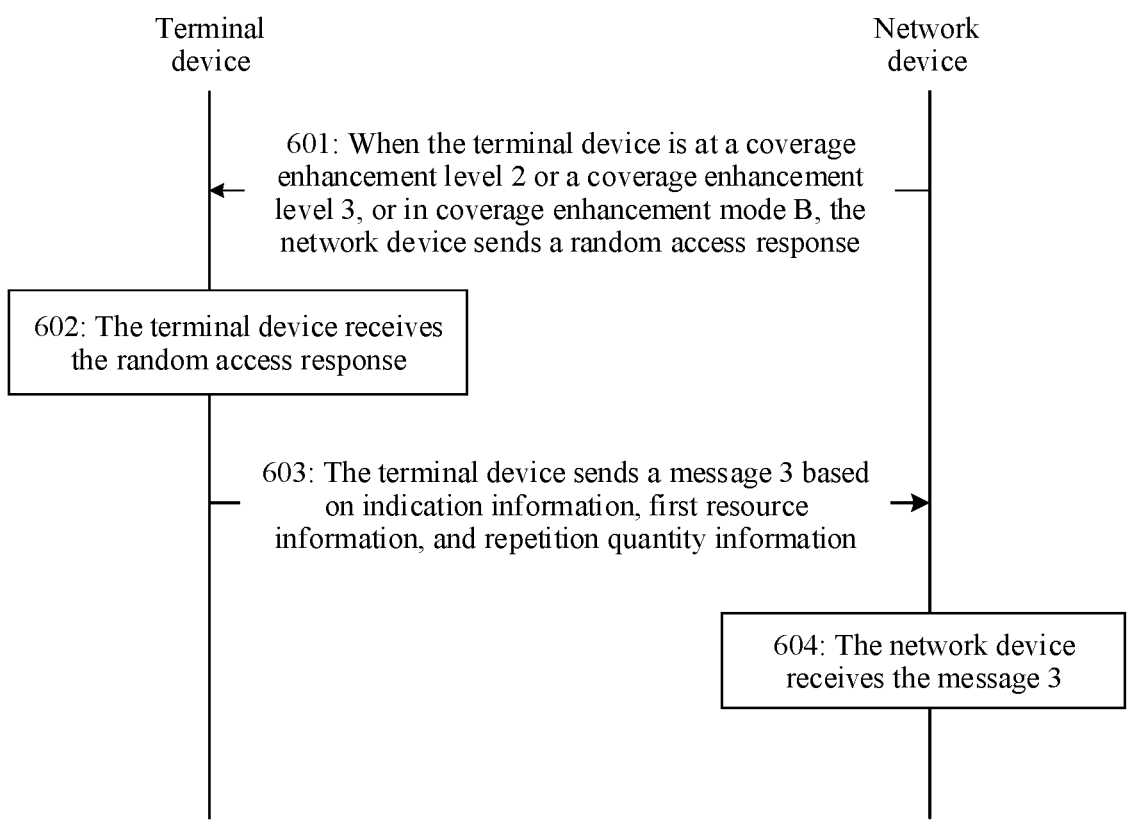
FIG. 6 is a schematic diagram of another interaction procedure between a terminal device and a network device according to an embodiment of this application.

FIG. 6 is a schematic diagram of another interaction procedure between a network device and a terminal device according to an embodiment of this application. An information transmission method provided in this embodiment of this application mainly includes the following steps.

601: When the terminal device is at a coverage enhancement level 2 or a coverage enhancement level 3, or in coverage enhancement mode B, the network device sends a random access response.

The random access response includes indication information and uplink grant information. The indication information is used to indicate that a message 3 to be sent by the terminal device is a first message 3 or a second message 3, the first message 3 is a message 3 that does not carry user data, and the second message 3 is a message 3 that carries the user data.

The uplink grant information includes first resource information and repetition quantity information, the first resource information is used to indicate a resource used by the terminal device to send the message 3 on a first narrowband in an uplink bandwidth, and the repetition quantity information is used to indicate a quantity of times that the terminal device is to repeatedly send the message 3. When the indication information indicates that the message 3 to be sent by the terminal device is the first message 3, a quantity of bits of the first resource information is 3. For example, when the terminal device is in mode B, three bits are used to indicate an allocated resource by using an uplink resource allocation type 2 scheme, and the uplink resource allocation type 2 manner is applicable only to BL/CE UE for which the coverage level B is configured. Definitions of a resource indication field are shown in the following table.

| Value of the resource allocation field | Allocated resource block |
|---|---|
| '000' | 0 |
| '001' | 1 |
| '010' | 2 |
| '011' | 3 |
| '100' | 4 |
| '101' | 5 |
| '110' | 0 and 1 |
| '111' | 2 and 3 |

When the indication information indicates that the message 3 to be sent by the terminal device is the second message 3, a quantity of bits of the first resource information is K, where K is a pre-specified positive integer, and K is greater than 3.

In this embodiment of this application, the network device may send a random access response to the terminal device, and the random access response includes indication information and uplink grant information. The indication information is used to indicate that a message 3 to be sent by the terminal device is a first message 3 or a second message 3, and the message 3 is a third message (which may also be referred to as a Msg3) transmitted by the terminal device. The message 3 refers to a third message in a random access process, and the message 3 may carry user data. For example, the message 3 may support early data transmission (EDT). Corresponding resources may be separately configured for a plurality of types of messages that can be sent by the terminal device. For example, messages 3 in a random access process may be classified into at least two different types, for example, a first message 3 and a second message 3. Therefore, the terminal device may send two different types of messages 3, and the network device may separately configure corresponding resources for sending different messages 3. For example, the first message 3 is a message 3 that does not carry user data, and the first message 3 may also be referred to as a legacy message 3 (legacy Msg3); the second message 3 is a message 3 that carries the user data, and the second message 3 may also be referred to as an EDT Msg3. For example, the first message 3 may be a message 3 for normal transmission. For another example, the first message 3 may be a message 3 for which data transmission is not performed early. For example, the second message 3 is a message 3 for which data transmission is performed early.

The uplink grant information includes first resource information and repetition quantity information. For example, the network device allocates specific resources based on different messages 3 sent by the terminal device. For example, the network device may allocate, to the terminal device, a quantity of physical resource blocks (PRB) and a start resource block index that are used for the first message 3, or the network device may allocate, to the terminal device, a quantity of physical resource blocks and a start resource block index that are used for the second message 3. In subsequent embodiments, the physical resource block may also be referred to as a resource block for short.

In this embodiment of this application, the first resource information used when the terminal device sends the second message 3 is different from the first resource information used when the terminal device sends the first message 3. When the indication information indicates that the message 3 to be sent by the terminal device is the first message 3, a quantity of bits of the first resource information is 3; or when the indication information indicates that the message 3 to be sent by the terminal device is the second message 3, a quantity of bits of the first resource information is K, where K is greater than 3. When the message 3 to be sent by the terminal device is the second message 3, the first resource information may indicate more types of resources for sending on a first narrowband, thereby improving scheduling flexibility of the network device.

602: When the terminal device is at the coverage enhancement level 2 or the coverage enhancement level 3, or in coverage enhancement mode B, the terminal device receives the random access response.

The random access response includes the indication information and the uplink grant information. The indication information is used to indicate that the message 3 to be sent by the terminal device is the first message 3 or the second message 3, the first message 3 is a message 3 that does not carry the user data, and the second message 3 is a message 3 that carries the user data.

The uplink grant information includes the first resource information and the repetition quantity information, the first resource information is used to indicate the resource used by the terminal device to send the message 3 on the first narrowband in the uplink bandwidth, and the repetition quantity information is used to indicate the quantity of times that the terminal device is to repeatedly send the message 3; and when the indication information indicates that the message 3 to be sent by the terminal device is the first message 3, the quantity of bits of the first resource information is 3; or when the indication information indicates that the message 3 to be sent by the terminal device is the second message 3, the quantity of bits of the first resource information is K, where K is a pre-specified positive integer, and K is greater than 3.

603: The terminal device sends the message 3 based on the indication information, the first resource information, and the repetition quantity information.

In this embodiment of this application, after obtaining the indication information, the first resource information, and the repetition quantity information by using the random access response, the terminal device determines a type of the to-be-sent message 3 by using the indication information, may determine, by using the first resource information, the resource used to send the message 3, and determines, by using the repetition quantity information, the quantity of times that the terminal device needs to repeatedly send the message 3, and then the terminal device may send the message 3 to the network device, for example, send the message 3 through a wireless network. For example, if the indication information indicates that first data is the first message 3, the terminal device may send the first message 3 based on currently received scheduling information; or if the indication information indicates that first data is the second message 3, the terminal device may send the second message 3 based on currently received scheduling information.

604: The network device receives the message 3.

In this embodiment of this application, the terminal device transmits the message 3 based on the indication information, the first resource information, and the repetition quantity information, and the network device may receive, based on the indication information, the first resource information, and the repetition quantity information, the message 3 sent by the terminal device. For example, if the indication information indicates that the message 3 is the first message 3, the terminal device may send the first message 3, and the network device may receive the first message 3 sent by the terminal device; or if the indication information indicates that the message 3 is the second message 3, the terminal device may send the second message 3, and the network device may receive the second message 3 sent by the terminal device.

In this embodiment of this application, the random access response sent by the network device includes the indication information and the uplink grant information, the indication information may indicate that the message 3 to be sent by the terminal device is the first message 3 or the second message 3, and the uplink grant information includes the first resource information and the repetition quantity information. The first resource information used when the terminal device sends the second message 3 is different from the first resource information used when the terminal device sends the first message 3. When the indication information indicates that the message 3 to be sent by the terminal device is the first message 3, the quantity of bits of the first resource information is 3; or when the indication information indicates that the message 3 to be sent by the terminal device is the second message 3, the quantity of bits of the first resource information is K, where K is greater than 3. When the message 3 to be sent by the terminal device is the second message 3, the second resource information may indicate more types of resources for sending on the first narrowband, thereby improving the scheduling flexibility of the network device.

In the foregoing embodiment, when the terminal device is at the coverage enhancement level 2 or the coverage enhancement level 3, or in coverage enhancement mode B, and the indication information indicates that the message 3 to be sent by the terminal device is the second message 3, the quantity of bits of the second resource information is N. For example, N is equal to $N_{NB}^{index}$, or N is equal to 3, or N is equal to 4.

In the foregoing embodiment, when the message 3 to be sent by the terminal device is the second message 3, the quantity of bits of the first resource information is L, where L is greater than 4.

In the foregoing embodiment, when the message 3 sent by the terminal device is the second message 3, the quantity of bits of the second resource information is M, where M is a pre-specified integer, and M is equal to $N_{NB}^{index}$, or M is equal to 3, or M is equal to 4.

In the foregoing embodiment, when the terminal device is at the coverage enhancement level 2 or the coverage enhancement level 3, or in coverage enhancement mode B, and the message 3 to be sent by the terminal device is the second message 3, the quantity of bits of the first resource information is K, where K is a pre-specified positive integer, and K is greater than 3.

Further, N and M satisfy the following relationship: In mode B, when the terminal device transmits the first message 3, a length of a Msg3 PUSCH narrowband index field is two bits, and a length of a Msg3/4 MPDCCH narrowband index field is two bits; or when the terminal device transmits the second message 3, because a 2-bit TBS field is released, the two released bits may be used to indicate a more flexible Msg3 PUSCH narrowband index and/or indicate a more flexible Msg3/4 MPDCCH narrowband index. Finally, a sum of the Msg3 PUSCH narrowband index field and the Msg3/4 MPDCCH narrowband index field cannot be two bits more than that when the first message 3 is transmitted, that is, the sum of the two cannot be greater than six bits.

N, M, and K satisfy the following relationship: A sum of a value of N, a value of M, and a value of K is not greater than 9.

In mode B, when the terminal device transmits the first message 3, a length of a Msg3 PUSCH narrowband index field is two bits, a length of a Msg3/4 MPDCCH narrowband index field is two bits, and a length of a field indicating resource allocation on a narrowband for transmitting the Msg3 is three bits; or when the terminal device transmits the second message 3, because a 2-bit TBS field is released, the two released bits may be used to indicate one or two of a more flexible Msg3 PUSCH narrowband index, a more flexible Msg3/4 MPDCCH narrowband index, and more flexible resource allocation on a narrowband for transmitting the Msg3. Finally, a sum of the Msg3 PUSCH narrowband index field, the Msg3/4 MPDCCH narrowband index field, and the field indicating the resource allocation on the narrowband for transmitting the Msg3 cannot be two bits more than that when the first message 3 is transmitted, that is, the sum of the three cannot be greater than nine bits.

M and L satisfy the following relationship: A sum of a value of M and a value of L is not greater than 9; or a sum of a value of M and a value of L is not greater than 10; or a sum of a value of M and a value of L is not greater than 11.

In mode A, when the terminal device transmits the first message 3, a length of a Msg3/4 MPDCCH narrowband index field is two bits, and a length of a field indicating resource allocation on a narrowband for transmitting the Msg3 is four bits; or when the terminal device transmits the second message 3, because a 3-bit MCS field is released, the three released bits may be used to indicate either or both of a more flexible Msg3/4 MPDCCH narrowband index and more flexible resource allocation on a narrowband for transmitting the Msg3. Finally, a sum of the Msg3/4 MPDCCH narrowband index field and the field indicating the resource allocation on the narrowband for transmitting the Msg3 cannot be three bits more than that when the first message 3 is transmitted, that is, the sum of the two cannot be greater than nine bits.

To better understand and implement the foregoing solutions in the embodiments of this application, the following uses a corresponding application scenario as an example for detailed description.

In the embodiments of this application, in an EDT process, a network device configures a maximum TBS for each coverage enhancement level/mode by using a system message. The network device may further enable UE to select a preset TBS value that corresponds to the maximum TBS and that is less than or equal to the maximum TBS. If the network device enables the UE to select the preset TBS value that corresponds to the maximum TBS and that is less than or equal to the maximum TBS, during decoding, the network device needs to blindly detect a TBS value used by the UE. If the network device does not enable the UE to select the preset TBS value that corresponds to the maximum TBS and that is less than or equal to the maximum TBS, the UE sends, based on the maximum TBS configured by the network device, a Msg3 including user data. Therefore, an MCS field/a TBS field in an UL grant of a MAC RAR is not used.

According to an existing protocol, for a Msg3 PUSCH narrowband in mode B, and Msg3/4 MPDCCH narrowbands in CE mode A and CE mode B, because only two bits are used to indicate a specific narrowband, a maximum of four narrowbands in narrowbands can be indicated. Therefore, when a system bandwidth is greater than 5 MHz (four narrowbands), a quantity of indicated narrowbands is limited. For a resource allocation field, because a length of the field is limited, resource allocation types in mode A and mode B are limited.

In the embodiments of this application, a problem that allocation of the Msg3 PUSCH narrowband in mode A and the Msg3/4 MPDCCH narrowbands in mode A and mode B are limited can be resolved. The problem that resource allocation types in mode A and mode B are limited can be further resolved.

First, scheduling of initial transmission of the Msg3 is described. An uplink resource for the initial transmission of the Msg3 is scheduled in the uplink grant (UL grant) of the MAC RAR in a MAC PDU. One MAC PDU includes one MAC header, zero or more MAC RARs, and an optional padding part. One MAC header includes one or more MAC PDU subheaders. One MAC header may include one backoff indicator subheader. If the MAC header includes the backoff indication subheader, there is only one subheader, and the subheader is the first subheader. In addition to the backoff indicator subheader, the MAC PDU subheader and the MAC RAR are in a one-to-one correspondence.

Fields included in the MAC RAR are shown in the following Table 1:

| DCI content | CE mode A | CE mode B |
|---|---|---|
| Msg3 PUSCH narrowband index | $N_{NB}^{index}$ | 2 |
| Msg3 PUSCH resource allocation | 4 | 3 |
| Msg3 PUSCH repetition quantity | 2 | 3 |
| Modulation and coding scheme (MCS) | 3 | 0 |
| Transport block size (TBS) | 0 | 2 |
| Transmit power control (TPC) | 3 | 0 |
| Information state information (CSI) request | 1 | 0 |
| Uplink (UL) delay | 1 | 0 |
| Msg3/4 MPDCCH narrowband index | 2 | 2 |
| Padding bit (Zero padding) | $4-N_{NB}^{index}$ | 0 |
| Total bit quantity (Total Nr-bits) | 20 | 12 |

In the embodiments of this application, the released MCS/TBS field may be used to indicate a more flexible Msg3 PUSCH narrowband or Msg3/4 MPDCCH narrowband. The following plurality of implementations are mainly included:

For the mode A, two bits in the released 3-bit MCS field are used to indicate a flexible Msg3/4 MPDCCH narrowband index, a length of the field "Msg3/4 MPDCCH narrowband index" is changed to $N_{NB}^{index}$ bits, and a length of "Zero padding" is changed to $8-2N_{NB}^{index}$ bits.

For the mode B, the released 2-bit TBS field is used to indicate a flexible Msg3 PUSCH narrowband index, a length of the field "Msg3 PUSCH narrowband index" is $N_{NB}^{index}$ bits, and a length of "Zero padding" is changed to $4-N_{NB}^{index}$ bits.

Alternatively, for the mode B, the released 2-bit TBS field is used to indicate a flexible Msg3/4 MPDCCH narrowband index, a length of the field "Msg3/4 MPDCCH narrowband index" is changed to $N_{NB}^{index}$ bits, and a length of "Zero padding" is changed to $4-N_{NB}^{index}$ bits.

Alternatively, for the mode B, one bit in two released bits is used to indicate a flexible Msg3 PUSCH narrowband index, and the other bit indicates a flexible Msg3/4 MPDCCH narrowband index, a length of the field "Msg3 PUSCH narrowband index" is three bits, and a length of the field "Msg3/4 MPDCCH narrowband index" is changed to three bits.

In the embodiments of this application, a mapping relationship between a bit status and a corresponding narrowband is stored. A base station needs to determine to-be-sent control information based on a resource allocated to the UE and the mapping relationship between a bit status and a corresponding narrowband. A side of the UE needs to determine, based on the mapping relationship between a bit status and a corresponding narrowband, the resource allocated by the base station to the UE. The released MCS/TBS field is used to indicate a more flexible Msg3 PUSCH narrowband or Msg3/4 MPDCCH narrowband without additionally increasing DCI overheads, thereby improving scheduling flexibility of the base station.

In some other embodiments of this application, released bits may be used to indicate more flexible resource allocation on a narrowband. The following plurality of implementations are mainly included:

For the mode A, one bit in the released 3-bit MCS field is used to extend the field "Msg3 PUSCH resource allocation" to indicate flexible Msg3 PUSCH resource allocation, and a length of the field "Msg3 PUSCH resource allocation" is changed to five bits; and/or two bits in the released 3-bit TBS field are used to indicate a flexible Msg3/4 MPDCCH narrowband index, a length of the field "Msg3/4 MPDCCH narrowband index" is changed to $N_{NB}^{index}$ bits, and a length of "Zero padding" is changed to $8-N_{NB}^{index}$ bits.

For the mode B, one bit or two bits in the released 2-bit TBS field is/are used to indicate flexible Msg3 PUSCH resource allocation, and a length of the field "Msg3 PUSCH resource allocation" is four or five bits; and/or one bit in the released 2-bit TBS field is used to indicate a flexible Msg3 PUSCH narrowband index, or one bit indicates a flexible Msg3/4 MPDCCH narrowband index.

A length of the field "Msg3 PUSCH narrowband index" is three bits, or a length of the field "Msg3/4 MPDCCH narrowband index" is changed to three bits.

In the embodiments of this application, memories on a side of a base station and a side of the UE need to store a mapping relationship between a bit status and resource allocation. The base station needs to determine to-be-sent control information based on a resource allocated to the UE and the mapping relationship between a bit status and a corresponding narrowband. The side of the UE needs to determine, based on the mapping relationship between a bit status and resource allocation, the resource allocated by the base station to the UE. More flexible Msg3 PUSCH resource allocation and/or Msg3 PUSCH narrowband or Msg3/4 MPDCCH narrowband allocation are/is supported without additionally increasing DCI overheads.

In some other embodiments of this application, released bits may be used to indicate more flexible resource allocation on a narrowband. The following plurality of implementations may be mainly included:

For the mode A, when the system bandwidth is 1.4 MHz, because there is only one narrowband in the system bandwidth, the narrowband does not need to be indicated, and a total of 9 bits are released: five bits=three bits of the MCS field+two bits of a Msg3/4 MPDCCH narrowband index, and "Zero padding"=four bits, so that the MAC RAR may be reduced by 1 byte, and a quantity of bits of the MAC RAR is 12. In this case, to be compatible with a new RAR and a legacy RAR, the network device places the legacy RAR in front of the new RAR in the MAC PDU.

In the embodiments of this application, memories on a side of a base station and a side of the UE need to store the new MAC RAR, a length of a UL grant in the MAC RAR, and division of fields in the UL grant. The base station needs to send the new MAC RAR and the new UL grant, and the UE needs to interpret the new MAC RAR and the UL grant. The quantity of bits of the MAC RAR is reduced without affecting flexibility of the MAC RAR, thereby improving transmission performance of the MAC RAR.

It should be noted that for brief description, the foregoing method embodiments are represented as a series of actions. However, a person skilled in the art should appreciate that this application is not limited to the described order of the actions, because according to this application, some steps may be performed in other orders or simultaneously. A person skilled in the art should further appreciate that the embodiments described in this specification all belong to embodiments, and the involved actions and modules are not necessarily required for this application.

To better implement the foregoing solutions in the embodiments of this application, the following further provides related apparatuses for implementing the foregoing solutions.

Figure 7:
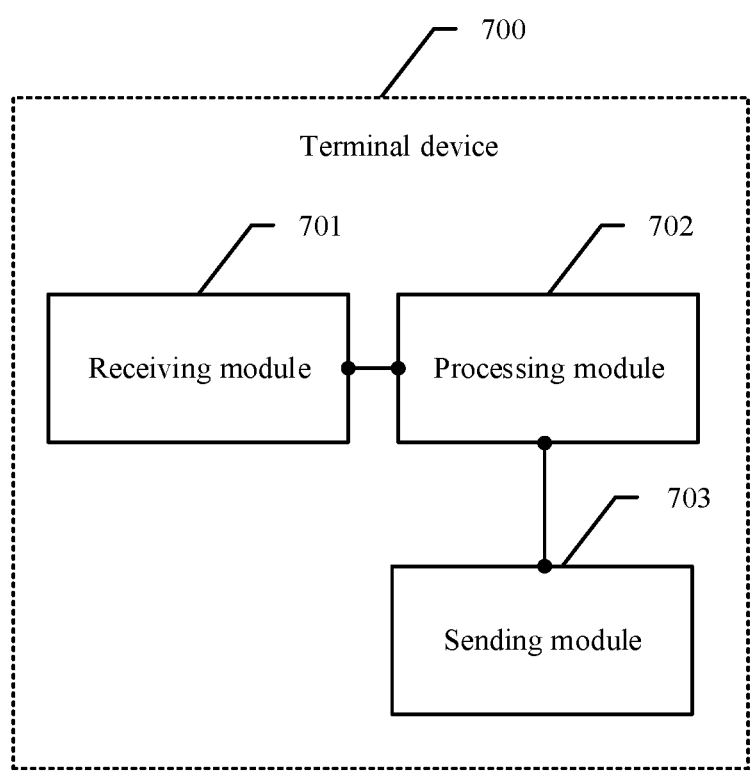
FIG. 7 is a schematic structural composition diagram of a terminal device according to an embodiment of this application.

An embodiment of this application provides a terminal device. As shown in FIG. 7, the terminal device 700 includes a receiving module 701, a processing module 702, and a sending module 703, where the processing module 702 is configured to: when the terminal device is at a coverage enhancement level 0 or a coverage enhancement level 1, or in coverage enhancement mode A, receive a random access response by using the receiving module 701, where the random access response includes indication information and uplink grant information, the indication information is used to indicate that a message 3 to be sent by the terminal device is a first message 3 or a second message 3, the first message 3 is a message 3 that does not carry user data, and the second message 3 is a message 3 that carries the user data, where the uplink grant information includes first resource information and repetition quantity information, and when an uplink bandwidth of the terminal device is 1.4 megahertz MHz, the first resource information is used to indicate a resource used by the terminal device to send the message 3 on a first narrowband in the uplink bandwidth, and the repetition quantity information is used to indicate a quantity of times that the terminal device is to repeatedly send the message 3; and when the indication information indicates that the message 3 to be sent by the terminal device is the first message 3, a quantity of bits of the uplink grant information is 20; or when the indication information indicates that the message 3 to be sent by the terminal device is the second message 3, a quantity of bits of the uplink grant information is 12; and the processing module 702 is further configured to send the message 3 based on the indication information, the first resource information, and the repetition quantity information by using the sending module 703.

Figure 8:
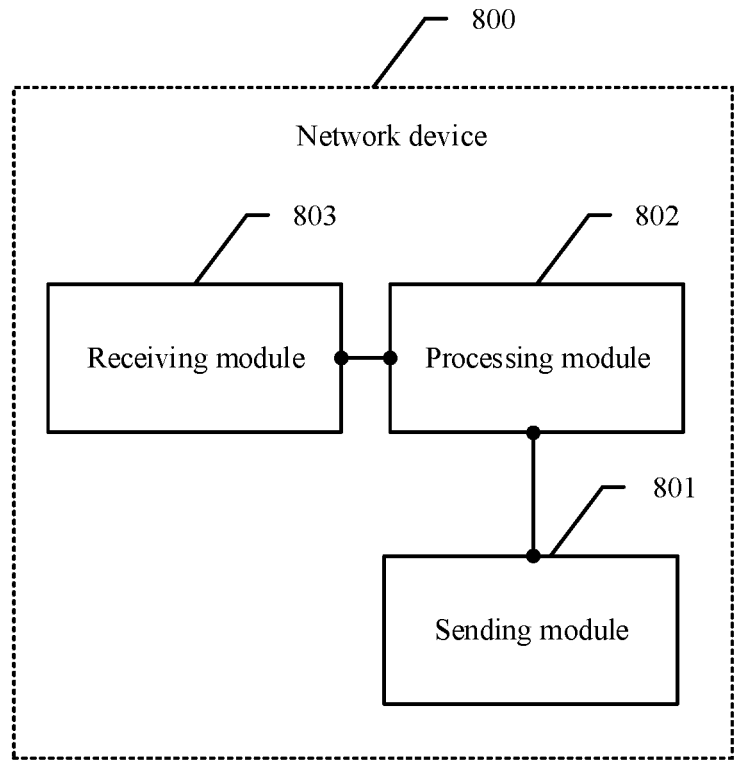
FIG. 8 is a schematic structural composition diagram of a network device according to an embodiment of this application.

An embodiment of this application provides a network device. As shown in FIG. 8, the network device 800 includes a sending module 801, a processing module 802, and a receiving module 803, where the processing module 802 is configured to: when a terminal device is at a coverage enhancement level 0 or a coverage enhancement level 1, or in coverage enhancement mode A, generate a random access response, where the random access response includes indication information and uplink grant information, the indication information is used to indicate that a message 3 to be sent by the terminal device is a first message 3 or a second message 3, the first message 3 is a message 3 that does not carry user data, and the second message 3 is a message 3 that carries the user data, where the uplink grant information includes first resource information and repetition quantity information, and when an uplink bandwidth of the terminal device is 1.4 megahertz MHz, the first resource information is used to indicate a resource used by the terminal device to send the message 3 on a first narrowband in the uplink bandwidth, and the repetition quantity information is used to indicate a quantity of times that the terminal device is to repeatedly send the message 3; and when the indication information indicates that the message 3 to be sent by the terminal device is the first message 3, a quantity of bits of the uplink grant information is 20; or when the indication information indicates that the message 3 to be sent by the terminal device is the second message 3, a quantity of bits of the uplink grant information is 12;

the processing module 802 is further configured to send the random access response by using the sending module 801; and the processing module 802 is further configured to receive the message 3 by using the receiving module 803.

In some embodiments of this application, no bit in the uplink grant information indicates an index of a narrowband, and the narrowband is used by the terminal device to receive a physical downlink control channel; a quantity of bits of a modulation and coding scheme field in the uplink grant information is 1; and there is no padding bit in the uplink grant information; or no bit in the uplink grant information indicates a modulation and coding scheme field, and there is no padding bit in the uplink grant information; or no bit in the uplink grant information indicates an index of a narrowband, and the narrowband is used by the terminal device to receive a physical downlink control channel; no bit in the uplink grant information indicates a modulation and coding scheme field; and a quantity of padding bits in the uplink grant information is 1; and the physical downlink control channel is used for scheduling of the message 3 or a message 4.

An embodiment of this application further provides a terminal device. A composition structure of the terminal device is shown in FIG. 7. However, functions of the receiving module, the processing module, and the sending module in this embodiment are all different from the functions in the embodiment shown in FIG. 7. The terminal device may include the receiving module, the processing module, and the sending module, where the processing module is configured to: when the terminal device is at a coverage enhancement level 2 or a coverage enhancement level 3, or in coverage enhancement mode B, receive a random access response by using the receiving module, where the random access response includes indication information and uplink grant information, the indication information is used to indicate that a message 3 to be sent by the terminal device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the terminal device to send the message 3 on a first narrowband in an uplink bandwidth, the repetition quantity information is used to indicate a quantity of times that the terminal device is to repeatedly send the message 3, and the second resource information is used to indicate an index of the first narrowband of the terminal device in the uplink bandwidth; and when the indication information indicates that the message 3 to be sent by the terminal device is the first message 3, a quantity of bits of the second resource information is 2; or when the indication information indicates that the message 3 to be sent by the terminal device is the second message 3, a quantity of bits of the second resource information is N, where N is a pre-specified integer, and N is equal to $N_{NB}^{index}$, or N is equal to 3, or N is equal to 4, where $N_{NB}^{index}$ is a quantity of bits required to indicate all narrowbands in the uplink bandwidth; and the processing module is further configured to send the message 3 based on the indication information, the first resource information, the second resource information, and the repetition quantity information by using the sending module.

An embodiment of this application further provides a network device. A composition structure of the network device is shown in FIG. 8. However, functions of the receiving module, the processing module, and the sending module in this embodiment are all different from the functions in the embodiment shown in FIG. 8. The network device includes the sending module, the processing module, and the receiving module, where the processing module is configured to: when a terminal device is at a coverage enhancement level 2 or a coverage enhancement level 3, or in coverage enhancement mode B, generate a random access response, where the random access response includes indication information and uplink grant information, the indication information is used to indicate that a message 3 to be sent by the terminal device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the terminal device to send the message 3 on a first narrowband in an uplink bandwidth, the repetition quantity information is used to indicate a quantity of times that the terminal device is to repeatedly send the message 3, and the second resource information is used to indicate an index of the first narrowband of the terminal device in the uplink bandwidth; and when the indication information indicates that the message 3 to be sent by the terminal device is the first message 3, a quantity of bits of the second resource information is 2; or when the indication information indicates that the message 3 to be sent by the terminal device is the second message 3, a quantity of bits of the second resource information is N, where N is a pre-specified integer, and N is equal to $N_{NB}^{index}$, or N is equal to 3, or N is equal to 4, where $N_{NB}^{index}$ is a quantity of bits required to indicate all narrowbands in the uplink bandwidth;

the processing module is further configured to send the random access response by using the sending module; and the processing module is further configured to receive the message 3 by using the receiving module.

An embodiment of this application further provides a terminal device. A composition structure of the terminal device is shown in FIG. 7. However, functions of the receiving module, the processing module, and the sending module in this embodiment are all different from the functions in the embodiment shown in FIG. 7. The terminal device includes the receiving module, the processing module, and the sending module, where the processing module is configured to: when the terminal device is at a coverage enhancement level 0 or a coverage enhancement level 1, or in coverage enhancement mode A, receive a random access response by using the receiving module, where the random access response includes indication information and uplink grant information, the indication information is used to indicate that a message 3 to be sent by the terminal device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the terminal device to send the message 3 on a first narrowband in an uplink bandwidth, and the repetition quantity information is used to indicate a quantity of times that the terminal device is to repeatedly send the message 3; and when the indication information indicates that the message 3 to be sent by the terminal device is the first message 3, a quantity of bits of the first resource information is 4; or when the indication information indicates that the message 3 to be sent by the terminal device is the second message 3, a quantity of bits of the first resource information is L, where L is a pre-specified positive integer, and L is greater than 4; and the processing module is configured to send the message 3 based on the indication information, the first resource information, and the repetition quantity information by using the sending module.

An embodiment of this application further provides a network device. A composition structure of the network device is shown in FIG. 8. However, functions of the receiving module, the processing module, and the sending module in this embodiment are all different from the functions in the embodiment shown in FIG. 8. The network device includes the sending module, the processing module, and the receiving module, where the processing module is configured to: when a terminal device is at a coverage enhancement level 0 or a coverage enhancement level 1, or in coverage enhancement mode A, generate a random access response, where the random access response includes indication information and uplink grant information, the indication information is used to indicate that a message 3 to be sent by the terminal device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the terminal device to send the message 3 on a first narrowband in an uplink bandwidth, and the repetition quantity information is used to indicate a quantity of times that the terminal device is to repeatedly send the message 3; and when the indication information indicates that the message 3 to be sent by the terminal device is the first message 3, a quantity of bits of the first resource information is 4; or when the indication information indicates that the message 3 to be sent by the terminal device is the second message 3, a quantity of bits of the first resource information is L, where L is a pre-specified positive integer, and L is greater than 4;

the processing module is further configured to send the random access response by using the sending module; and the processing module is further configured to receive the message 3 by using the receiving module.

An embodiment of this application further provides a terminal device. A composition structure of the terminal device is shown in FIG. 7. However, functions of the receiving module, the processing module, and the sending module in this embodiment are all different from the functions in the embodiment shown in FIG. 7. The terminal device includes the receiving module, the processing module, and the sending module, where the processing module is configured to receive a random access response by using the receiving module, where the random access response includes indication information and uplink grant information, the indication information is used to indicate that a message 3 to be sent by the terminal device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the terminal device to send the message 3 on a first narrowband in an uplink bandwidth, the repetition quantity information is used to indicate a quantity of times that the terminal device is to repeatedly send the message 3, and the second resource information is used to indicate an index of a narrowband, where the narrowband is used by the terminal device to receive a physical downlink control channel, and the physical downlink control channel is used for scheduling of the message 3 or a message 4; and when the indication information indicates that the message 3 to be sent by the terminal device is the first message 3, a quantity of bits of the second resource information is 2; or when the indication information indicates that the message 3 to be sent by the terminal device is the second message 3, a quantity of bits of the second resource information is M, where M is a pre-specified integer, and M is equal to $N_{NB}^{index}$, or M is equal to 3, or M is equal to 4, where $N_{NB}^{index}$ is a quantity of bits required to indicate all narrowbands in the uplink bandwidth; and the processing module is configured to send the message 3 based on the indication information, the first resource information, the second resource information, and the repetition quantity information by using the sending module.

An embodiment of this application further provides a network device. A composition structure of the network device is shown in FIG. 8. However, functions of the receiving module, the processing module, and the sending module in this embodiment are all different from the functions in the embodiment shown in FIG. 8. The network device includes the sending module, the processing module, and the receiving module, where the processing module is configured to generate a random access response, where the random access response includes indication information and uplink grant information, the indication information is used to indicate that a message 3 to be sent by a terminal device is a first message 3 or a second message 3, the first message 3 is a message 3 that does not carry user data, and the second message 3 is a message 3 that carries the user data, where the uplink grant information includes first resource information, second resource information, and repetition quantity information, the first resource information is used to indicate a resource used by the terminal device to send the message 3 on a first narrowband in an uplink bandwidth, the repetition quantity information is used to indicate a quantity of times that the terminal device is to repeatedly send the message 3, and the second resource information is used to indicate an index of a narrowband, where the narrowband is used by the terminal device to receive a physical downlink control channel, and the physical downlink control channel is used for scheduling of the message 3 or a message 4; and when the indication information indicates that the message 3 to be sent by the terminal device is the first message 3, a quantity of bits of the second resource information is 2; or when the indication information indicates that the message 3 to be sent by the terminal device is the second message 3, a quantity of bits of the second resource information is M, where M is a pre-specified integer, and M is equal to $N_{NB}^{index}$, or M is equal to 3, or M is equal to 4, where $N_{NB}^{index}$ is a quantity of bits required to indicate all narrowbands in the uplink bandwidth;

the processing module is further configured to send the random access response by using the sending module; and the processing module is further configured to receive the message 3 by using the receiving module.

An embodiment of this application further provides a terminal device. A composition structure of the terminal device is shown in FIG. 7. However, functions of the receiving module, the processing module, and the sending module in this embodiment are all different from the functions in the embodiment shown in FIG. 7. The terminal device includes the receiving module, the processing module, and the sending module, where the processing module is configured to: when the terminal device is at a coverage enhancement level 2 or a coverage enhancement level 3, or in coverage enhancement mode B, receive a random access response by using the receiving module, where the random access response includes indication information and uplink grant information, the indication information is used to indicate that a message 3 to be sent by the terminal device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the terminal device to send the message 3 on a first narrowband in an uplink bandwidth, and the repetition quantity information is used to indicate a quantity of times that the terminal device is to repeatedly send the message 3; and when the indication information indicates that the message 3 to be sent by the terminal device is the first message 3, a quantity of bits of the first resource information is 3; or when the indication information indicates that the message 3 to be sent by the terminal device is the second message 3, a quantity of bits of the first resource information is K, where K is a pre-specified positive integer, and K is greater than 3; and the processing module is configured to send the message 3 based on the indication information, the first resource information, and the repetition quantity information by using the sending module.

An embodiment of this application further provides a network device. A composition structure of the network device is shown in FIG. 8. However, functions of the receiving module, the processing module, and the sending module in this embodiment are all different from the functions in the embodiment shown in FIG. 8. The network device includes the sending module, the processing module, and the receiving module, where the processing module is configured to: when a terminal device is at a coverage enhancement level 2 or a coverage enhancement level 3, or in coverage enhancement mode B, generate a random access response, where the random access response includes indication information and uplink grant information, the indication information is used to indicate that a message 3 to be sent by the terminal device is a first message 3 or a second message 3, the first message 3 is a message 3 that does not carry user data, and the second message 3 is a message 3 that carries the user data, where the uplink grant information includes first resource information and repetition quantity information, the first resource information is used to indicate a resource used by the terminal device to send the message 3 on a first narrowband in an uplink bandwidth, and the repetition quantity information is used to indicate a quantity of times that the terminal device is to repeatedly send the message 3; and when the indication information indicates that the message 3 to be sent by the terminal device is the first message 3, a quantity of bits of the first resource information is 3; or when the indication information indicates that the message 3 to be sent by the terminal device is the second message 3, a quantity of bits of the first resource information is K, where K is a pre-specified positive integer, and K is greater than 3;

the processing module is further configured to send the random access response by using the sending module; and the processing module is further configured to receive the message 3 by using the receiving module.

It should be noted that content, such as information exchange between and execution processes of the modules/units of the apparatus, is based on an ideal the same as that of the method embodiments of the present invention, and produces technical effects the same as those of the method embodiments of the present invention. For specific content, refer to the foregoing descriptions in the method embodiments of the present invention, and details are not described herein again.

An embodiment of this application further provides a computer storage medium. The computer storage medium stores a program, and the program is executed to perform some or all of the steps described in the foregoing method embodiments.

Figure 9:
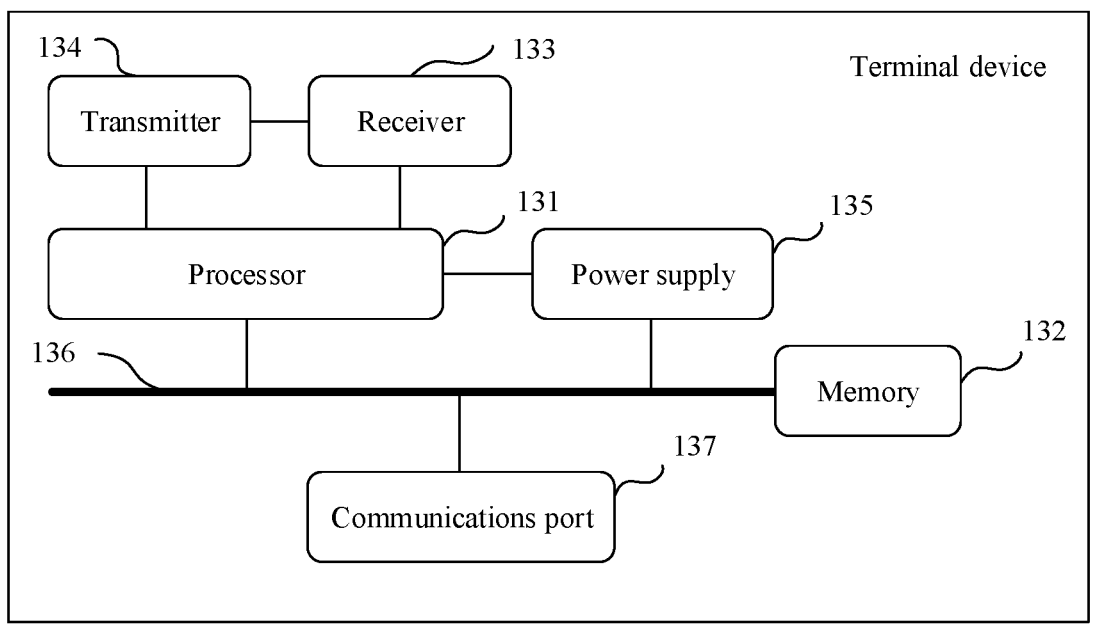
FIG. 9 is a schematic structural composition diagram of another terminal device according to an embodiment of this application.

FIG. 9 is a schematic structural diagram of another device according to an embodiment of this application. The device is a terminal device, and the terminal device may include a processor 131 (for example, a CPU), a memory 132, a transmitter 134, and a receiver 133. The transmitter 134 and the receiver 133 are coupled to the processor 131, and the processor 131 controls a sending action of the transmitter 134 and a receiving action of the receiver 133. The memory 132 may include a high-speed RAM memory, and may further include a non-volatile memory NVM, for example, at least one magnetic disk memory. The memory 132 may store various instructions, to complete various processing functions and implement the method steps in the embodiments of this application. Optionally, the terminal device in this embodiment of this application may further include one or more of a power supply 135, a communications bus 136, or a communications port 137. The receiver 133 and the transmitter 134 may be integrated into a transceiver of the terminal device, or may be a receive antenna and a transmit antenna that are independent of each other on the terminal device. The communications bus 136 is configured to implement a communication connection between the elements. The communications port 137 is configured to implement a connection and communication between the terminal device and another peripheral.

In this embodiment of this application, the memory 132 is configured to store computer-executable program code, and the program code includes an instruction. When the processor 131 executes the instruction, the instruction enables the processor 131 to perform a processing action of the terminal device in the foregoing method embodiments, and enables the transmitter 134 to perform a sending action of the terminal device in the foregoing method embodiments. Implementation principles and technical effects are similar to those of the method embodiments, and details are not described herein again.

Figure 10:
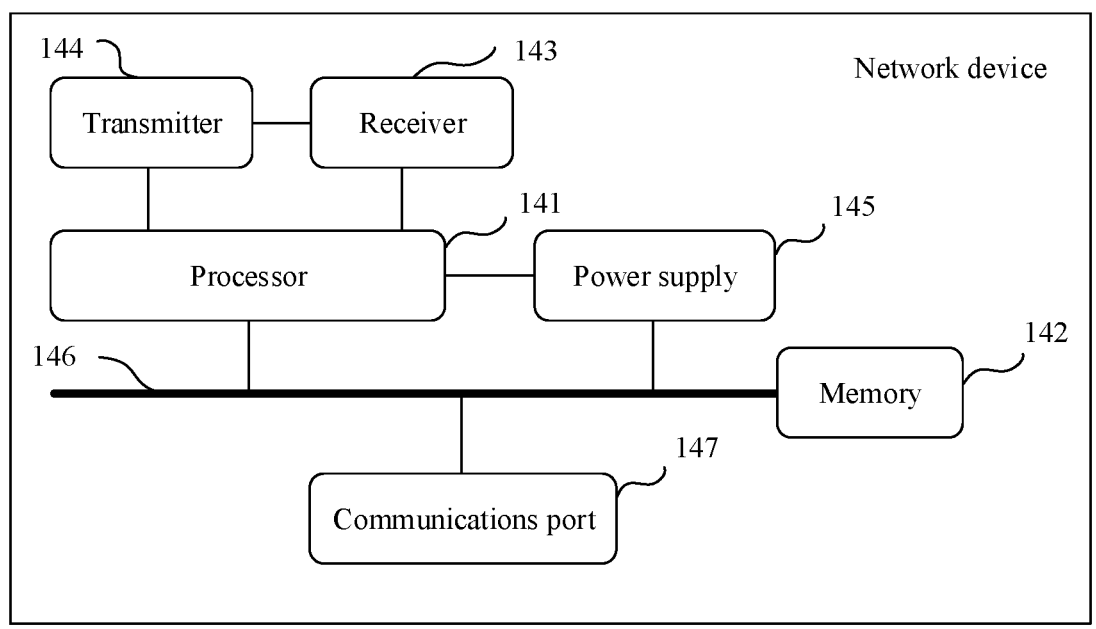
FIG. 10 is a schematic structural composition diagram of another network device according to an embodiment of this application.

FIG. 10 is a schematic structural diagram of another device according to an embodiment of this application. The device is a network device, and the network device may include a processor 141 (for example, a CPU), a memory 142, a receiver 143, and a transmitter 144. The receiver 143 and the transmitter 144 are coupled to the processor 141, and the processor 141 controls a receiving action of the receiver 143 and a sending action of the transmitter 144. The memory 142 may include a high-speed RAM memory, and may further include a non-volatile memory NVM, for example, at least one magnetic disk memory. The memory 142 may store various instructions, to complete various processing functions and implement the method steps in the embodiments of this application. Optionally, the network device in this embodiment of this application may further include one or more of a power supply 145, a communications bus 146, or a communications port 147. The receiver 143 and the transmitter 144 may be integrated into a transceiver of the network device, or may be a receive antenna and a transmit antenna that are independent of each other on the network device. The communications bus 146 is configured to implement a communication connection between the elements. The communications port 147 is configured to implement a connection and communication between the network device and another peripheral.

In this embodiment of this application, the memory 142 is configured to store computer-executable program code, and the program code includes an instruction. When the processor 141 executes the instruction, the instruction enables the processor 141 to perform a processing action of the network device in the foregoing method embodiments, and enables the transmitter 144 to perform a sending action of the network device in the foregoing method embodiments. Implementation principles and technical effects are similar to those of the method embodiments, and details are not described herein again.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, to enable the chip in the terminal to perform the wireless communication method according to the first aspect. Optionally, the storage unit may be a storage unit in the chip, such as a register or a buffer, or the storage unit may be a storage unit in the terminal but outside the chip, such as a read-only memory (\ROM), another type of static storage device capable of storing static information and instructions, or a random access memory (RAM).

The processor mentioned anywhere above may be a general-purpose central processing unit (CPU), a microprocessor, an application-specific integrated circuit (ASIC), or one or more integrated circuits for controlling program execution of the wireless communication method according to the first aspect.

In addition, it should be noted that the apparatus embodiments described above are merely examples. The units described as separate parts may or may not be physically separate, and parts displayed as units may or may not be physical units, may be located in one position, or may be distributed on a plurality of network units. Some or all the modules may be selected based on actual requirements to achieve the objectives of the solutions in the embodiments. In addition, in the accompanying drawings of the apparatus embodiments provided in this application, a connection relationship between modules indicate that the modules have a communication connection with each other, which may be specifically implemented as one or more communications buses or signal cables. A person of ordinary skill in the art may understand and implement the embodiments of the present invention without creative efforts.

Based on the descriptions of the foregoing implementations, a person skilled in the art may clearly understand that this application may be implemented by software in addition to necessary universal hardware, or by special-purpose hardware, including an application-specific integrated circuit, a special-purpose CPU, a special-purpose memory, a special-purpose component, and the like. Generally, any functions that can be performed by a computer program can be easily implemented by using corresponding hardware. Moreover, a specific hardware structure used to achieve a same function may be of various forms, for example, in a form of an analog circuit, a digital circuit, or a dedicated circuit. However, as for this application, a software program implementation is a better implementation in most cases. Based on such an understanding, the technical solutions in this application essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, the embodiments may be implemented partially in a form of a computer program product.

The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. An information transmission method, comprising:
when a communications device is at a coverage enhancement level 0 or a coverage enhancement level 1, or in coverage enhancement mode A, receiving, by the communications device, a random access response, wherein the random access response comprises indication information and uplink grant information, the indication information indicates that a message 3 to be sent by the communications device is a first message 3 or a second message 3, the first message 3 is a message 3 that does not carry user data, and the second message 3 is a message 3 that carries the user data, wherein the uplink grant information comprises first resource information and repetition quantity information, the first resource information indicates a resource used by the communications device to send the message 3 on a first narrowband in an uplink bandwidth, and the repetition quantity information indicates a quantity of times that the communications device is to repeatedly send the message 3; and when the indication information indicates that the message 3 to be sent by the communications device is the second message 3, a quantity of bits of the first resource information is L, wherein L is a pre-specified positive integer, and L is greater than 4; and sending, by the communications device, the message 3 based on the indication information, the first resource information, and the repetition quantity information.

2. The method according to claim 1, wherein L is equal to 5.

3. An information receiving method, comprising:

when a communications device is at a coverage enhancement level 0 or a coverage enhancement level 1, or in coverage enhancement mode A, sending, by a network device, a random access response, wherein the random access response comprises indication information and uplink grant information, the indication information indicates that a message 3 to be sent by the communications device is a first message 3 or a second message 3, the first message 3 is a message 3 that does not carry user data, and the second message 3 is a message 3 that carries the user data, wherein the uplink grant information comprises first resource information and repetition quantity information, the first resource information indicates a resource used by the communications device to send the message 3 on a first narrowband in an uplink bandwidth, and the repetition quantity information indicates a quantity of times that the communications device is to repeatedly send the message 3; and when the indication information indicates that the message 3 to be sent by the communications device is the second message 3, a quantity of bits of the first resource information is L, wherein L is a pre-specified positive integer, and L is greater than 4; and receiving, by the network device, the message 3.

4. The method according to claim 3, wherein L is equal to 5.

5. A communications device, comprising:
a receiver;
a transmitter; and
at least one processor, communicatively coupled with the receiver and the transmitter and configured to: when the communications device is at a coverage enhancement level 0 or a coverage enhancement level 1, or in coverage enhancement mode A, receive a random access response by using the receiver, wherein the random access response comprises indication information and uplink grant information, the indication information indicates that a message 3 to be sent by the communications device is a first message 3 or a second message 3, the first message 3 is a message 3 that does not carry user data, and the second message 3 is a message 3 that carries the user data, wherein the uplink grant information comprises first resource information and repetition quantity information, the first resource information indicates a resource used by the communications device to send the message 3 on a first narrowband in an uplink bandwidth, and the repetition quantity information indicates a quantity of times that the communications device is to repeatedly send the message 3; and when the indication information indicates that the message 3 to be sent by the communications device is the second message 3, a quantity of bits of the first resource information is L, wherein L is a pre-specified positive integer, and L is greater than 4; and the at least one processor is further configured to send the message 3 based on the indication information, the first resource information, and the repetition quantity information by using the transmitter.

6. The device according to claim 5, wherein L is equal to 5.

7. A network device, comprising:
a receiver;
a transmitter; and
at least one processor, communicatively coupled with the receiver and the transmitter and configured to: when a communications device is at a coverage enhancement level 0 or a coverage enhancement level 1, or in coverage enhancement mode A, generate a random access response, wherein the random access response comprises indication information and uplink grant information, the indication information indicates that a message 3 to be sent by the communications device is a first message 3 or a second message 3, the first message 3 is a message 3 that does not carry user data, and the second message 3 is a message 3 that carries the user data, wherein the uplink grant information comprises first resource information and repetition quantity information, the first resource information indicates a resource used by the communications device to send the message 3 on a first narrowband in an uplink bandwidth, and the repetition quantity information indicates a quantity of times that the communications device is to repeatedly send the message 3; and when the indication information indicates that the message 3 to be sent by the communications device is the second message 3, a quantity of bits of the first resource information is L, wherein L is a pre-specified positive integer, and L is greater than 4; and the at least one processor is further configured to send the random access response by using the transmitter, and receive the message 3 by using the receiver.

8. The device according to claim 7, wherein L is equal to 5.

9. The method according to claim 1, further comprising:
receiving, by the communications device, another random access response, wherein the another random access response comprises another indication information and another uplink grant information, the another indication information indicates that an another message 3 to be sent by the communications device is a another first message 3 or a another second message 3, the another first message 3 is an another message 3 that does not carry another user data, and the another second message 3 is an another message 3 that carries the another user data, wherein the another uplink grant information comprises another first resource information and another repetition quantity information, and when the another indication information indicates that the another message 3 to be sent by the communications device is the another first message 3, an another quantity of bits of the another first resource information is 4.

10. The method according to claim 3, further comprising:
sending, by the network device, another random access response, wherein the another random access response comprises another indication information and another uplink grant information, the another indication information indicates that an another message 3 to be sent by the communications device is a another first message 3 or a another second message 3, the another first message 3 is an another message 3 that does not carry another user data, and the another second message 3 is an another message 3 that carries the another user data, wherein the another uplink grant information comprises another first resource information and another repetition quantity information, and when the another indication information indicates that the another message 3 to be sent by the communications device is the another first message 3, an another quantity of bits of the another first resource information is 4.

11. The communications device according to claim 5, wherein the at least one processor is configured to:
receive another random access response, wherein the another random access response comprises another indication information and another uplink grant information, the another indication information indicates that an another message 3 to be sent by the communications device is a another first message 3 or a another second message 3, the another first message 3 is an another message 3 that does not carry another user data, and the another second message 3 is an another message 3 that carries the another user data, wherein the another uplink grant information comprises another first resource information and another repetition quantity information, and when the another indication information indicates that the another message 3 to be sent by the communications device is the another first message 3, an another quantity of bits of the another first resource information is 4.

12. The network device according to claim 7, wherein the at least one processor is configured to:
send, another random access response, wherein the another random access response comprises another indication information and another uplink grant information, the another indication information indicates that an another message 3 to be sent by the communications device is a another first message 3 or a another second message 3, the another first message 3 is an another message 3 that does not carry another user data, and the another second message 3 is an another message 3 that carries the another user data, wherein the another uplink grant information comprises another first resource information and another repetition quantity information, and when the another indication information indicates that the another message 3 to be sent by the communications device is the another first message 3, an another quantity of bits of the another first resource information is 4.

* * * * *